(12) United States Patent
Toguri et al.

(10) Patent No.: US 6,532,445 B1
(45) Date of Patent: Mar. 11, 2003

(54) INFORMATION PROCESSING FOR RETRIEVING CODED AUDIOVISUAL DATA

(75) Inventors: Yasuhiro Toguri, Kanagawa (JP); Kenzo Akagiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/397,234

(22) Filed: Sep. 16, 1999

(30) Foreign Application Priority Data

Sep. 24, 1998 (JP) ............................................ 10-269114

(51) Int. Cl.⁷ .............................. G10L 15/08; G06F 7/02

(52) U.S. Cl. ........................ 704/270; 704/205; 704/218; 707/101; 707/6

(58) Field of Search ................................. 704/205, 216, 704/217, 218, 209, 270, 239, 252; 707/1, 101, 6; 348/465, 907; 386/35; 725/145

(56) References Cited

U.S. PATENT DOCUMENTS

| 4,370,681 A | 1/1983 | Akagiri ........................ 360/68 |
| 5,042,069 A | 8/1991 | Chhatwal et al. ............. 381/31 |
| 5,264,846 A | 11/1993 | Oikawa ........................ 341/76 |

(List continued on next page.)

OTHER PUBLICATIONS

J. Princen et al., "Analysis/Synthesis Filter Bank Design Based On Time Domain Aliasing Cancellation," IEEE Transactions On Acoustics, Speech and Signal Processing, vol. ASSP–34, No. 5, Oct. 1986, pp. 1153–1161.

P. Chu, "Quadrature Mirror Filter Design For An Arbitrary Number Of Equal Bandwidth Channels," IEEE Transactions On Acoustics, Speech And Signal Processing, vol. ASSP–33, No. 1, Feb. 1985, pp. 203–218.

M. Krasner, "The Critical Band Coder—Digital Encoding Of Speech Signals Based On The Perceptual Requirements Of The Auditory System," IEEE 1980, vol. 1–3, pp. 327–331.

R. Zelinski et al., "Adaptive Transform Coding Of Speech Signals," IEEE Transactions On Acoustics, Speech And Signal Processing, vol. ASSP–25, No. 4, Aug. 1977, pp. 299–309.

J. Princen et al., "Subband/Transform Coding Using Filter Bank Designs Based On Time Domain Aliasing Cancellation," ICASSP, Apr. 6–9, 1987, vol. 4, pp. 2161–2164.

U.S. patent application Ser. No. 08/924,231, filed Sep. 5, 1997.

*Primary Examiner*—David D. Knepper
*Assistant Examiner*—Abul K. Azad
(74) *Attorney, Agent, or Firm*—Sonnenschein, Nath & Rosenthal

(57) ABSTRACT

In order to efficiently retrieve AV data by using signal characteristics as retrieval conditions, in a first step, a comparison and determination section computes a correlation coefficient (degree of similarity) of a spectrum coefficient of coded audio data and a spectrum coefficient of a sample waveform, and extracts correlation coefficients such that the value of the computed spectrum coefficient is larger than a threshold value which is set in the first step, and assumes them to be retrieval results. In a second step, the comparison and determination section determines whether or not the retrieval result is satisfactory. When it is determined that the number of pieces of audio data retrieved in the first step is equal to or greater than the predetermined threshold value and the retrieval result is not satisfactory, the process proceeds to a third step. In the third step, the comparison and determination section determines whether or not the number of frequency bands of the sample waveform, which is the retrieval conditions, is less than its maximum value. When it is determined that the number of frequency bands is less than its maximum value, in a fourth step, the number of frequency bands of the waveform signal, which is the retrieval conditions, is incremented by 1, and the process returns to the first step.

14 Claims, 22 Drawing Sheets

U.S. PATENT DOCUMENTS

| | | | |
|---|---|---|---|
| 5,268,685 A | 12/1993 | Fujiwara | 341/76 |
| 5,394,473 A | 2/1995 | Davidson | 381/36 |
| 5,437,050 A * | 7/1995 | Lamb et al. | 382/191 |
| 5,581,654 A | 12/1996 | Tsutsui | 395/2.39 |
| 5,612,729 A * | 3/1997 | Ellis et al. | 348/907 |
| 5,642,111 A | 6/1997 | Akagiri | 341/50 |
| 5,687,157 A | 11/1997 | Imai et al. | 369/124 |
| 5,737,718 A | 4/1998 | Tsutsui | 704/205 |
| 5,752,224 A | 5/1998 | Tsutsui et al. | 704/225 |
| 5,754,127 A | 5/1998 | Tsutsui et al. | 341/54 |
| 5,761,642 A | 6/1998 | Suzuki et al. | 704/503 |
| 5,778,339 A | 7/1998 | Sonohara et al. | 704/224 |
| 5,819,214 A | 10/1998 | Suzuki et al. | 704/229 |
| 5,825,310 A | 10/1998 | Tsutsui | 341/51 |
| 5,918,222 A * | 6/1999 | Fukui et al. | 704/251 |
| 6,011,824 A | 1/2000 | Oikawa et al. | 375/377 |
| 6,027,026 A * | 2/2000 | Husain et al. | 235/436 |
| 6,078,915 A * | 6/2000 | Okawa et al. | 707/3 |

* cited by examiner

INFORMATION PROCESSING FOR RETRIEVING CODED AUDIOVISUAL DATA

BACKGROUND OF THE INVENTION

1. Field of the Invention

The present invention relates to an information processing apparatus and method, an information recording apparatus and method, a recording medium, and a distribution medium. More particularly, the present invention relates to an information processing apparatus and method for retrieving compressed and coded audio data on the basis of signal characteristics, an information recording apparatus and method, a recording medium, and a distribution medium.

2. Description of the Related Art

In recent years, with the advancement of low-bit-rate coding technology, it has become common to store audio data and image data in such a way that they are compressed and coded, and a method is required for efficiently retrieving desired data from a large amount of coded data.

FIG. 23 shows the functional construction of a conventional audio data retrieval apparatus. In a database 156 of this audio data retrieval apparatus, a text database for retrieval is recorded in advance in which compressed and coded audio data (hereinafter referred to as "coded audio data"), and attribute information (for example, title, author name, creation date, classification of the contents, etc.) of the audio data, which is made to correspond to the coded audio data, are written.

A retrieval condition input section 151 accepts an input of retrieval conditions (attribute information, and signal characteristics of a sample waveform) from a usger, supplies the attribute information to an attribute retrieval section 152, and supplies the signal characteristics to a comparison and determination section 155.

The attribute retrieval section 152 retrieves data that matches the attribute information (for example, the author name) input from the retrieval condition input section 151 from the text database for retrieval which is stored in the database 156, extracts coded audio data corresponding thereto, and outputs it to a candidate selection section 153.

The candidate selection section 153 outputs the coded audio data input from the attribute retrieval section 152 in sequence to a decoding section 154. The decoding section 154 decodes the coded audio data input from the candidate selection section 153 and outputs it to the comparison and determination section 155.

The comparison and determination section 155 determines the degree of similarity between the audio data input from the decoding section 154 and the signal characteristics (for example, the waveform amplitude, etc.) of the sample waveform supplied from the retrieval input section. If the degree of similarity is equal to or higher than a predetermined threshold value, the audio data is output as a retrieval result. In order to determine the degree of similarity, for example, a method is available for computing a correlation coefficient of a waveform amplitude, an amplitude average value, a power distribution, a frequency spectrum, etc., of a sample waveform and of that of retrieved audio data.

Next, a description is given of a coding apparatus for creating coded audio data which is prerecorded in the database 156 of FIG. 23. Before that, a method for efficiently compressing and coding audio data is described. A method for efficiently compressing and coding audio data can be broadly classified into a band division coding method and a transform coding method. There is also a method in which both are combined.

The band division coding method is a method in which a discrete time waveform signal (for example, audio data) is divided into a plurality of frequency bands by a band division filter, such as a quadrature mirror filter QMF, and the most appropriate coding is performed for each band. This is also called "subband coding". The details of the quadrature mirror filter are described in, for example, P.L. Chu, "Quadrature mirror filter design for an arbitrary number of equal bandwidth channels", IEEE Trans. Acoust. Speech, Signal Processing, vol. ASSP-33, pp. 203–128, February 1985.

The transform coding method is also called a "block coding method", which is a method in which a discrete time waveform signal is divided into blocks in predetermined sampling units, a signal of this block (referred to also as a "frame") is converted into a frequency spectrum, and this is then coded. Examples of types of methods for conversion into a frequency spectrum include discrete Fourier transform DFT, discrete cosine transform DCT, and modified discrete cosine transform MDCT. The modified discrete cosine transform is able to perform efficient conversion with small block distortion by causing adjacent blocks on the time axis and the conversion sections to be superposed on each other. The details thereof are described in, for example, "Analysis/Synthesis Filter Bank Design Based on Time Domain Aliasing Cancellation": J. P. Princen, A. B. Bradley, IEEE Transactions, ASSP-34, No. 5, Oct. 1986, pp. 1153–1161, and "Subband/Transform Coding Using Filter Band Design Based on Time Domain Aliasing Cancellation": J. J. Princern, A. W. Johnson and A. B. Bradley (ICASSP 1987).

In the band division coding method, a signal which is divided for each frequency band is coded after being quantized, whereas in the transform coding method, a signal which is converted into a frequency spectrum is coded after being quantized, thereby making it possible to limit a band in which quantization noise occurs by using auditory properties, such as what is commonly called the "masking effect". Also, before this quantization, by normalizing each signal, efficient coding can be performed.

For example, when quantization is to be performed in the band division coding method, it is preferable that, by considering the auditory characteristics of a human being, a band division width be divided in a band width called a "critical band" such that the higher the frequency regions, the wider the band width.

The signal which is divided into frequency bands is allocated with a bit (bit allocation) for each band and is coded. For example, if bit allocation is performed dynamically on the basis of the amplitude absolute value of a signal for each band, the quantized noise spectrum becomes flat, and the noise energy becomes minimal. This method is described in, for example, "Adaptive Transform Coding of Speech Signals": R. Zelinski and P. Noll, IEEE Transactions of Acoustics Speech and Signal Processing, vol. ASSP-25, No. Aug. 4, 1997. However, in this method, a masking effect is not used, resulting in a problem in that this method is not the most appropriate from an auditory point of view.

Also, for example, if fixed bit allocation is performed so that satisfactory S/N is obtained for each band, a masking effect is obtained from an auditory point of view. However, for example, when characteristics of a sine wave are to be measured, there is a problem in that since bit allocation is fixed, a satisfactory characteristic value cannot be obtained. This method is described in "Thecritical band coder-digital encoding of the perceptual requirements of the auditory system": M. A. Kransner, MIT, (ICASSP 1980).

In order to solve these problems, there is also a method in which all bits which can be used for bit allocation are classified into dynamic allocation portions and fixed allocation portions, and the division ratio is made to depend on an input signal so that the more smooth the spectrum distribution of the input signal, the larger the ratio of the fixed allocation portions.

In the quantization and coding of an audio signal, in a waveform in which a point of sudden change in amplitude (hereinafter referred to as an "attack") is present such that the amplitude increases or decreases suddenly in a part of the audio waveform, a quantization error increases in an attack. Also, in a signal coded by a transform coding method, a quantization error of a spectrum coefficient in an attack is spread over the entire block on a time area during inverse spectrum transform (during decoding). As a result of this influence, noise which is commonly called a "pre-echo", which is unpleasant to listen to, occurs immediately before and after the point of sudden increase or decrease in amplitude.

In order to prevent this pre-echo, for example, there is a method (gain control) in which an attack of a waveform signal is detected in advance, and the gain of signals before and after the attack is amplified or attenuated so that the amplitudes of blocks in which the attack is present are made uniform. During the coding of this method, the information of the position of the gain and the gain-controlled level is coded together with the waveform signal in which gain control is performed. Also, during decoding time, the waveform signal is decoded by performing gain control inverse to that during coding time on the basis of the information of the position of the gain and the gain-controlled level. This method for performing gain control may be performed for each divided frequency band.

FIG. 24 shows the construction of a coding apparatus which creates coded audio data which is prerecorded in the database 156 of FIG. 23. This coding apparatus compresses and codes audio data by the above-described transform coding method.

A spectrum transformation section 161 converts an input audio waveform signal into a spectrum coefficient by a predetermined spectrum transform process (for example, a discrete cosine transform process) and outputs it to a quantization section 162. The quantization section 162 performs normalization and quantization on a spectrum coefficient input from the spectrum transformation section 161, and outputs the obtained quantized spectrum coefficient and the quantization parameter (normalization coefficient and quantization width coefficient) to a Huffman coding section 163. The Huffman coding section 163 converts the quantized spectrum coefficient and the quantization parameter input from the quantization section 162 into a variable length code and outputs them to a bit multiplexing section 164. The bit multiplexing section 164 multiplexes the coded quantized spectrum coefficient and the quantization parameter input from the Huffman coding section 163, and other coding parameters into a predetermined bit stream format, and outputs it.

FIG. 25 shows the construction of the decoding section 154 of FIG. 23, which decodes the coded audio data created by the coding apparatus of FIG. 24. A bit decomposition section 171 corresponding to the bit multiplexing section 164 of FIG. 24 decomposes the input coded audio data into a coded spectrum coefficient and a coding parameter and outputs them to a Huffman decoding section 172. The Huffman decoding section 172 performs decoding corresponding to the coding of the Huffman coding section 163 of FIG. 24 on the coded spectrum coefficient and the coding parameter and outputs the obtained quantized spectrum coefficient and the quantization parameter to an inverse quantization section 173. The inverse quantization section 173 inversely quantizes the quantized spectrum coefficient on the basis of the quantization parameter so that it is inversely normalized, and outputs the obtained spectrum coefficient to an inverse spectrum transformation section 174. The inverse spectrum transformation section 174 performs an inverse spectrum transformation process corresponding to the spectrum transformation process of the spectrum transformation section 161 of FIG. 24 on the spectrum coefficient input from the inverse quantization section 173, and outputs the obtained audio waveform signal.

In the retrieval by the above-described conventional audio data retrieval apparatus, in order to retrieve compressed and coded audio data, the compressed and coded audio data must be decoded completely, thereby resulting in problems in that enormous amounts of memory are necessary for storing the decoded information and very long processing times are required for decoding.

SUMMARY OF THE INVENTION

The present invention has been achieved in view of such circumstances. An object of the present invention is to make it possible to efficiently retrieve audiovisual (AV) data by decoding a part of AV data which is coded in such a manner as to correspond to retrieval conditions.

To achieve the above-mentioned object, according to a first aspect of the present invention, there is provided an information processing apparatus comprising: accepting means for accepting a retrieval condition; decoding means for decoding a part of the AV data which is coded in such a manner as to correspond to the retrieval condition accepted by the accepting means; computation means for computing a correlation coefficient of the retrieval condition accepted by the accepting means and the AV data decoded by the decoding means; comparison means for comparing the correlation coefficient computed by the computation means with a predetermined threshold value; and incrementing means for incrementing the retrieval condition or the threshold value.

According to a second aspect of the present invention, there is provided an information processing method comprising: an accepting step for accepting a retrieval condition; a decoding step for decoding a part of the AV data which is coded in such a manner as to correspond to the retrieval condition accepted in the accepting step; a computing step for computing a correlation coefficient of the retrieval condition accepted in the accepting step and the AV data decoded in the decoding step; a comparing step for comparing the correlation coefficient computed in the computation step with a predetermined threshold value; and an incrementing step for incrementing the retrieval condition or the threshold value.

According to a third aspect of the present invention, there is provided a distribution medium which distributes a computer-readable program to an information processing apparatus in order to execute a process, the process comprising: an accepting step for accepting a retrieval condition; a decoding step for decoding a part of the AV data which is coded in such a manner as to correspond to the retrieval condition accepted in the accepting step; a computing step for computing a correlation coefficient of the retrieval condition accepted in the accepting step and the AV data decoded in the decoding step; a comparing step for comparing the correlation coefficient computed in the computation step with a predetermined threshold value; and an incrementing step for incrementing the retrieval condition or the threshold value.

According to a fourth aspect of the present invention, there is provided an information processing apparatus comprising: accepting means for accepting a retrieval condition; extracting means for extracting a part of signal characteristics from AV data in which signal characteristics are hierarchically recorded in such a manner as to correspond to the retrieval condition accepted by the accepting means; computation means for computing a correlation coefficient of the retrieval condition accepted by the accepting means and the signal characteristics extracted by the extracting means; comparison means for comparing the correlation coefficient computed by the computation means with a predetermined threshold value; and incrementing means for incrementing the retrieval condition or the threshold value.

According to a fifth aspect of the present invention, there is provided an information processing method comprising: an accepting step for accepting a retrieval condition; an extracting step for extracting a part of signal characteristics from AV data in which the signal characteristics are hierarchically recorded in such a manner as to correspond to the retrieval condition accepted in the accepting step; a computing step for computing a correlation coefficient of the retrieval condition accepted in the accepting step and the signal characteristics extracted in the extracting step; a comparing step for comparing the correlation coefficient computed in the computation step with a predetermined threshold value; and an incrementing step for incrementing the retrieval condition or the threshold value.

According to a sixth aspect of the present invention, there is provided a distribution medium which distributes a computer-readable program to an information processing apparatus in order to execute a process, the process comprising: an accepting step for accepting a retrieval condition; an extracting step for extracting a part of signal characteristics from AV data in which the signal characteristics are hierarchically recorded in such a manner as to correspond to the retrieval condition accepted in the accepting step; a computing step for computing a correlation coefficient of the retrieval condition accepted in the accepting step and the signal characteristics extracted in the extracting step; a comparing step for comparing the correlation coefficient computed in the computation step with a predetermined threshold value; and an incrementing step for incrementing the retrieval condition or the threshold value.

According to a seventh aspect of the present invention, there is provided an information recording apparatus comprising: detection means for detecting a signal characteristic of input AV data; and recording means for hierarchically recording the signal characteristic detected by the detection means.

According to an eighth aspect of the present invention, there is provided an information recording method comprising: a detecting step for detecting a signal characteristic of input AV data; and a recording step for hierarchically recording the signal characteristic detected in the detecting step.

According to a ninth aspect of the present invention, there is provided a distribution medium which distributes a computer-readable program to an information processing apparatus in order to execute a process, the process comprising: a detecting step for detecting a signal characteristic of input AV data; and a recording step for hierarchically recording the signal characteristic detected in the detecting step.

According to a tenth aspect of the present invention, there is provided a recording medium in which AV data having signal characteristics hierarchically formed therein is recorded.

In the information processing apparatus, the information processing method, and the distribution medium in accordance with the present invention, a retrieval condition is accepted, a part of AV data which is coded in such a manner as to correspond to the accepted retrieval condition is decoded, a correlation coefficient of the accepted retrieval condition and the decoded AV data is computed, and the correlation coefficient is compared with a predetermined threshold value. Furthermore, the retrieval condition or the threshold value is incremented.

In the information processing apparatus, the information processing method, and the distribution medium in accordance with the present invention, a retrieval condition is accepted, a part of the signal characteristics are extracted from AV data in which signal characteristics are hierarchically recorded in such a manner as to correspond to the accepted retrieval condition, a correlation coefficient of the accepted retrieval condition and the extracted signal characteristics is computed, and the correlation coefficient is compared with a predetermined threshold value. Furthermore, the retrieval condition or the threshold value is incremented.

In the information recording apparatus, the information recording method, and the distribution medium in accordance with the present invention, signal characteristics of the input AV data are detected, and the detected signal characteristics are hierarchically recorded.

In the recording medium in accordance with the present invention, AV data having signal characteristics hierarchically formed therein is recorded.

The above and further objects, aspects and novel features of the invention will become more apparent from the following detailed description when read in connection with the accompanying drawings.

DESCRIPTION OF THE PREFERRED EMBODIMENT

Figure 1:
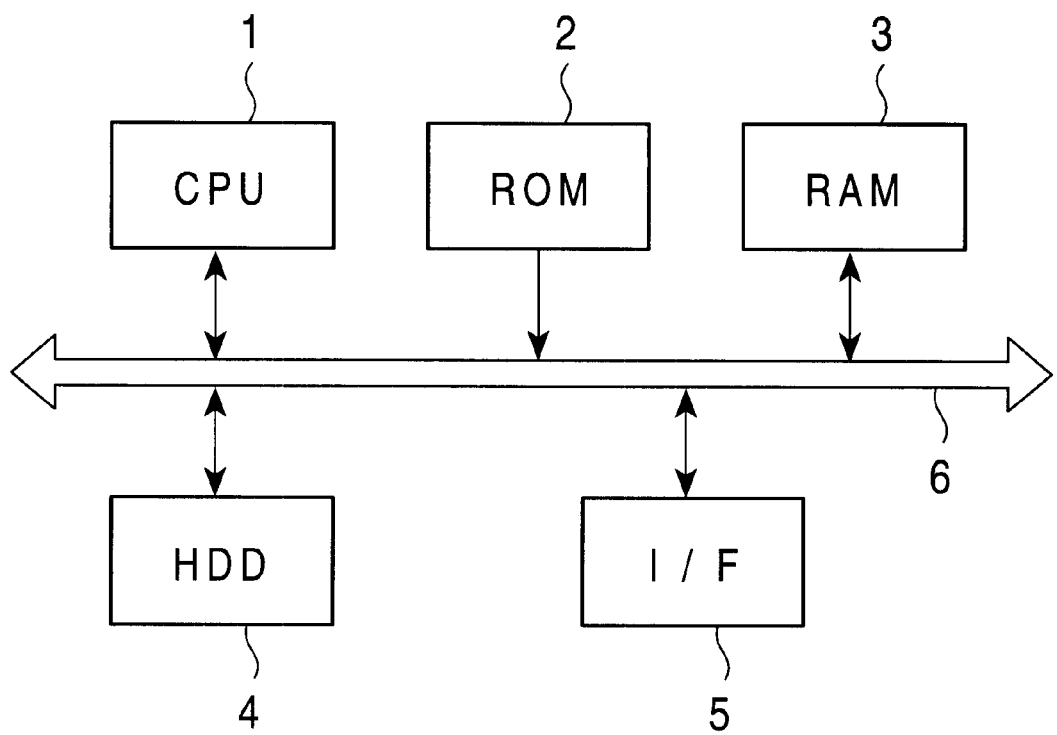
FIG. 1 is a block diagram showing an example of the construction of an audio data retrieval apparatus of the present invention.

An embodiment of the present invention will be described below. First, in order to clarify the corresponding relationships between each means of the invention as set forth in the claims and the following embodiment, the features of the present invention are described below by adding a corresponding embodiment (an example) in parentheses after each means. Of course, however, this description does not mean that each means is limited only to that so described.

An information processing apparatus of the present invention comprises accepting means (for example, an average-value calculation section 15 in FIG. 2) for accepting a retrieval condition; decoding means (for example, a bit extraction section 11 in FIG. 2) for decoding a part of the AV data which is coded in such a manner as to correspond to the retrieval condition accepted by the accepting means; computation means (for example, step S3 in FIG. 6) for computing a correlation coefficient of the retrieval condition accepted by the accepting means and the AV data decoded by the decoding means; comparison means (for example, step S3 in FIG. 6) for comparing the correlation coefficient computed by the computation means with a predetermined threshold value; and incrementing means (for example, step S6 in FIG. 6) for incrementing the retrieval condition or the threshold value.

An information processing apparatus of the present invention comprises accepting means (for example, an average-value calculation section 53 in FIG. 9) for accepting a retrieval condition; extracting means (for example, a recorded data reading section 51 in FIG. 9) for extracting a part of signal characteristics from AV data in which the signal characteristics are hierarchically recorded in such a manner as to correspond to the retrieval condition accepted by the accepting means; computation means (for example, step S3 in FIG. 6) for computing a correlation coefficient of the retrieval condition accepted by the accepting means and the signal characteristics extracted by the extracting means; comparison means (for example, step S3 in FIG. 6) for comparing the correlation coefficient computed by the computation means with a predetermined threshold value; and incrementing means (for example, step S6 in FIG. 6) for incrementing the retrieval condition or the threshold value.

An information recording apparatus of the present invention comprises detection means (for example, a spectrum transformation section 41 in FIG. 8B) for detecting signal characteristics of input AV data; and recording means (for example, a medium recording section 34 in FIG. 8B) for hierarchically recording signal characteristics detected by the detection means.

The construction of an audio data retrieval apparatus of the present invention is described with reference to FIG. 1. A CPU 1, a ROM 2, a RAM 3, a hard disk (HDD) 4, and an interface (I/F) 5 are connected to a bus 6 of this audio data retrieval apparatus.

The CPU 1 causes a retrieval program stored in the hard disk 4 to be transferred to the RAM 3 and to be stored therein in accordance with a BIOS (Basic Input/Output System) program stored in the ROM 2. Furthermore, the CPU 1 reads a retrieval program from the RAM 3 and executes it.

The hard disk 4 stores compressed and coded audio data for the object of retrieval together with the above-described retrieval program. The interface 5 accepts an input of retrieval condition. Also, the interface 5 outputs the retrieved result to a display, a speaker, etc. (not shown).

This audio data retrieval apparatus performs retrieval by using attribute information (text information) of audio data and signal characteristics as retrieval conditions in accordance with the retrieval program. The retrieval in which the attribute information of audio data is used as retrieval conditions is the same as the conventional retrieval method, and accordingly, that part in which retrieval is performed by using signal characteristics of audio data as retrieval conditions is described in the following description.

Figure 2:
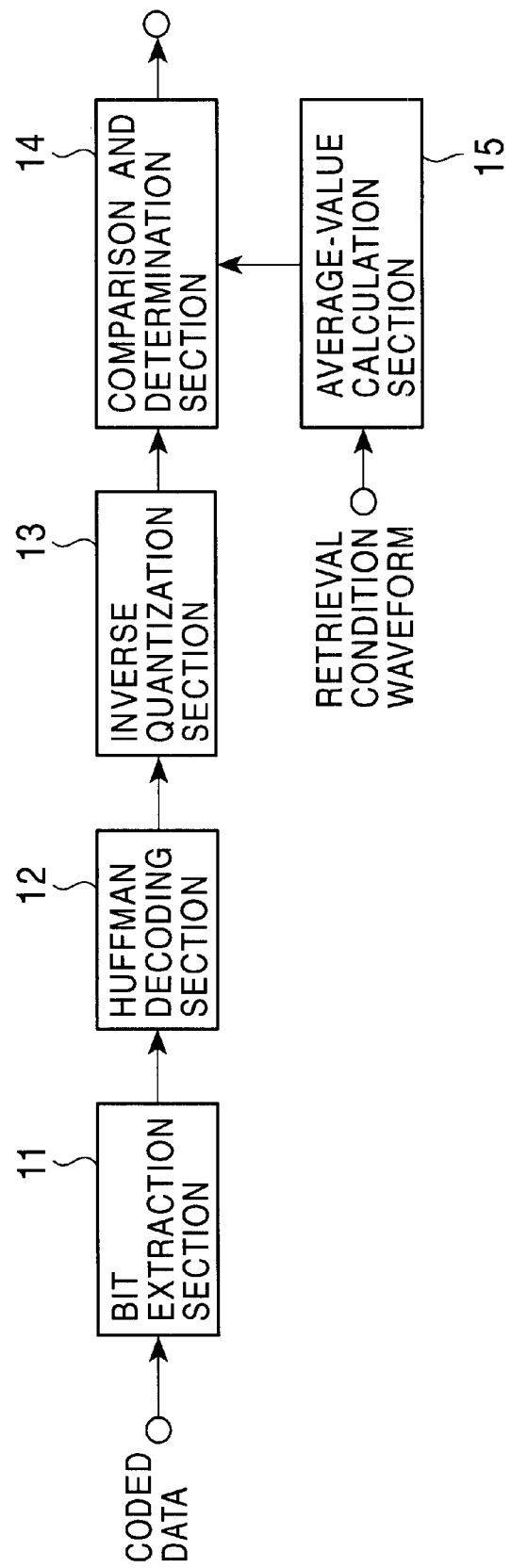
FIG. 2 is a block diagram showing an example of the functional construction of the audio data retrieval apparatus of FIG. 1.
Figure 3:
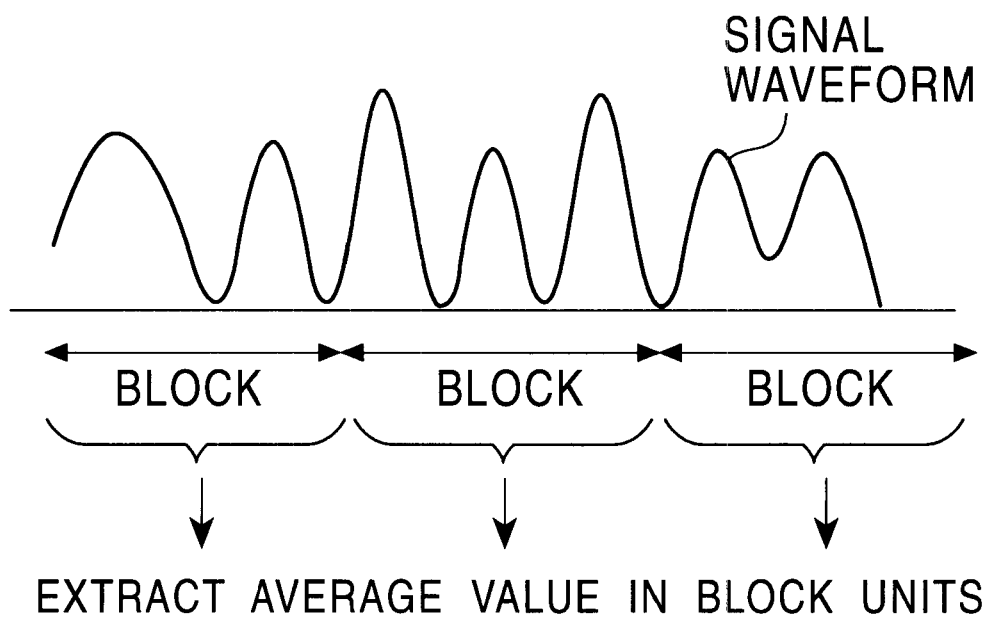
FIG. 3 is a diagram illustrating the retrieval conditions.

FIG. 2 shows an example of the construction of the functional blocks of the audio data retrieval apparatus. In this example of the construction, coded audio data is retrieved by using the amplitude average value in block units of a waveform signal such as that shown in FIG. 3 as retrieval conditions.

A bit extraction section 11 sequentially reads coded audio data stored in the hard disk 4, extracts therefrom only the DC components of a coded spectrum coefficient, and outputs them to a Huffman decoding section 12. The Huffman decoding section 12 decodes the DC components of the coded spectrum coefficient input from the bit extraction section 11, and outputs the obtained quantized spectrum coefficient to an inverse quantization section 13. The inverse quantization section 13 inversely quantizes the DC components of the quantized spectrum coefficient input from the Huffman decoding section 12, and outputs the DC components of the obtained spectrum coefficient to a comparison and determination section 14.

It is known that the DC components of the spectrum coefficient obtained herein are theoretically equal to the amplitude average value for each block of the original waveform signal before being coded due to the characteristics of discrete cosine transform during coding time. Therefore, there is no need to further perform inverse spectrum transform of the DC components of the spectrum coefficient.

The average-value calculation section 15 computes the amplitude average value in predetermined block units of a sample waveform input as retrieval conditions and outputs it to the comparison and determination section 14.

The comparison and determination section 14 determines the degree of similarity of the DC components of the spectrum coefficient with respect to the amplitude average value of the sample waveform by computing a correlation coefficient of the DC components of the spectrum coefficient input from the inverse quantization section 13 and the amplitude average value in predetermined block units of the sample waveform input from the average-value calculation section 15. Furthermore, the comparison and determination section 14 determines the matching or mismatching of both by comparing the determined degree of similarity with a predetermined threshold value and outputs the result. Also, the comparison and determination section 14 may output a value of the degree of similarity.

In a manner as described above, in the example of the construction of FIG. 2, since only the DC components of the coded spectrum coefficient are decoded, the processing time is shorter than in a case in which all the coded spectrum coefficients are coded, and a waveform signal obtained by performing inverse spectrum transform thereon is compared with a sample signal as in the conventional retrieval method. Also, it is possible to narrow the retrieval result by gradually increasing the above-described threshold value.

Figure 4:
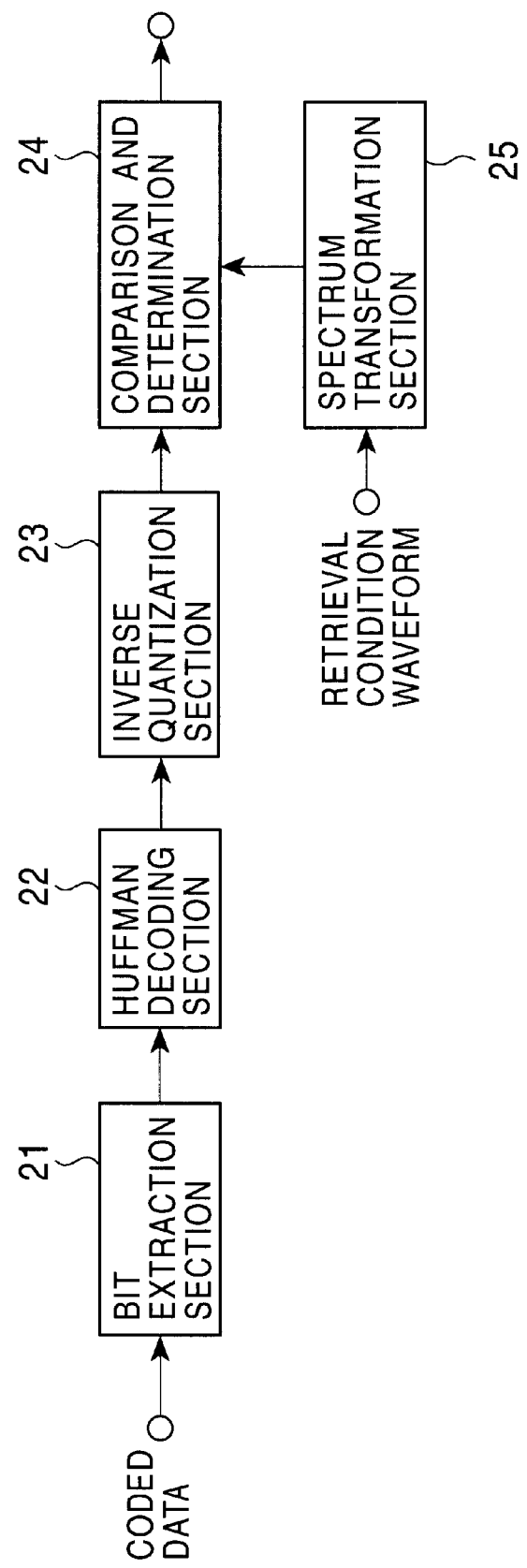
FIG. 4 is a block diagram showing an example of the functional construction of the audio data retrieval apparatus of FIG. 1.

FIG. 4 shows another example of the construction of the functional blocks of an audio data retrieval apparatus. In this example of the construction, as shown in FIG. 5, coded audio data is retrieved by using some of the spectrum coefficients in frame units of a waveform signal as retrieval conditions.

Figure 5:
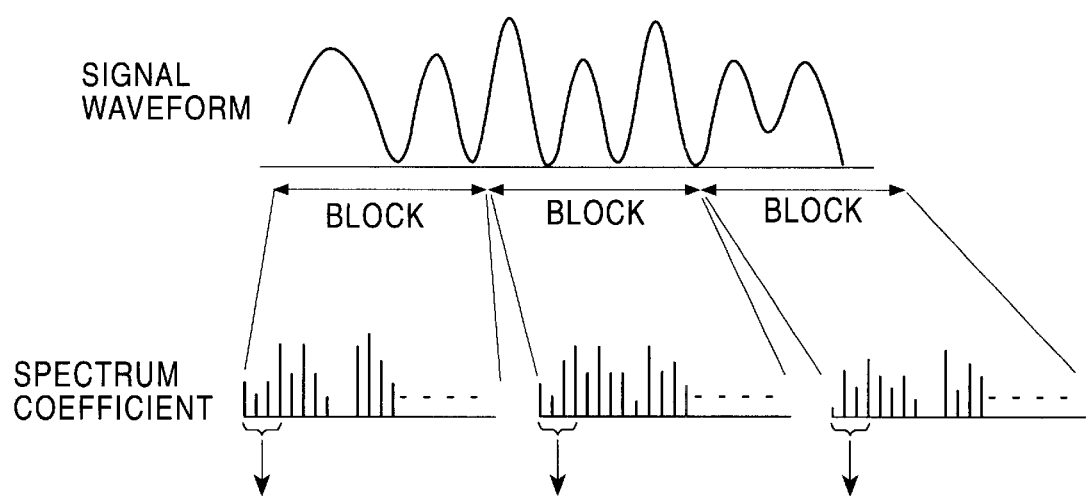
FIG. 5 is a diagram illustrating the retrieval conditions.

A bit extraction section 21 sequentially reads the coded audio data stored in the hard disk 4, extracts therefrom a coded spectrum coefficient of a part (for example, bands from the lower frequency region to the fourth as shown in FIG. 5) of the frequency bands corresponding to the retrieval conditions, and outputs it to a Huffman decoding section 22. The Huffman decoding section 22 decodes a part of coded spectrum coefficients input from the bit extraction section 21 and outputs the obtained quantized spectrum coefficient to an inverse quantization section 23. The inverse quantization section 23 inversely quantizes the quantized spectrum coefficient input from the Huffman decoding section 22, and outputs the obtained spectrum coefficient of a part of the frequency bands to a comparison and determination section 24.

A spectrum transformation section 25 computes a spectrum coefficient of a desired frequency band of a sample waveform input as retrieval conditions and outputs it to the comparison and determination section 24.

The comparison and determination section 24 computes a correlation coefficient of a part of frequency bands input from the inverse quantization section 23, and the spectrum coefficient of a desired frequency band of the sample waveform input from a spectrum transformation section 25, thereby determining the degree of similarity of both. Furthermore, the comparison and determination section 24 determines the matching or mismatching of both by comparing the determined degree of similarity with a predetermined threshold value and outputs the result. Also, the comparison and determination section 24 may output a value of the degree of similarity.

In a case in which the retrieval result is to be further narrowed in this example of the construction, if retrieval is performed by gradually increasing the number of frequency bands of a sample waveform, which is the retrieval conditions, and the threshold value for similarity determination, the retrieval result can be narrowed to a hierarchically detailed degree.

Figure 6:
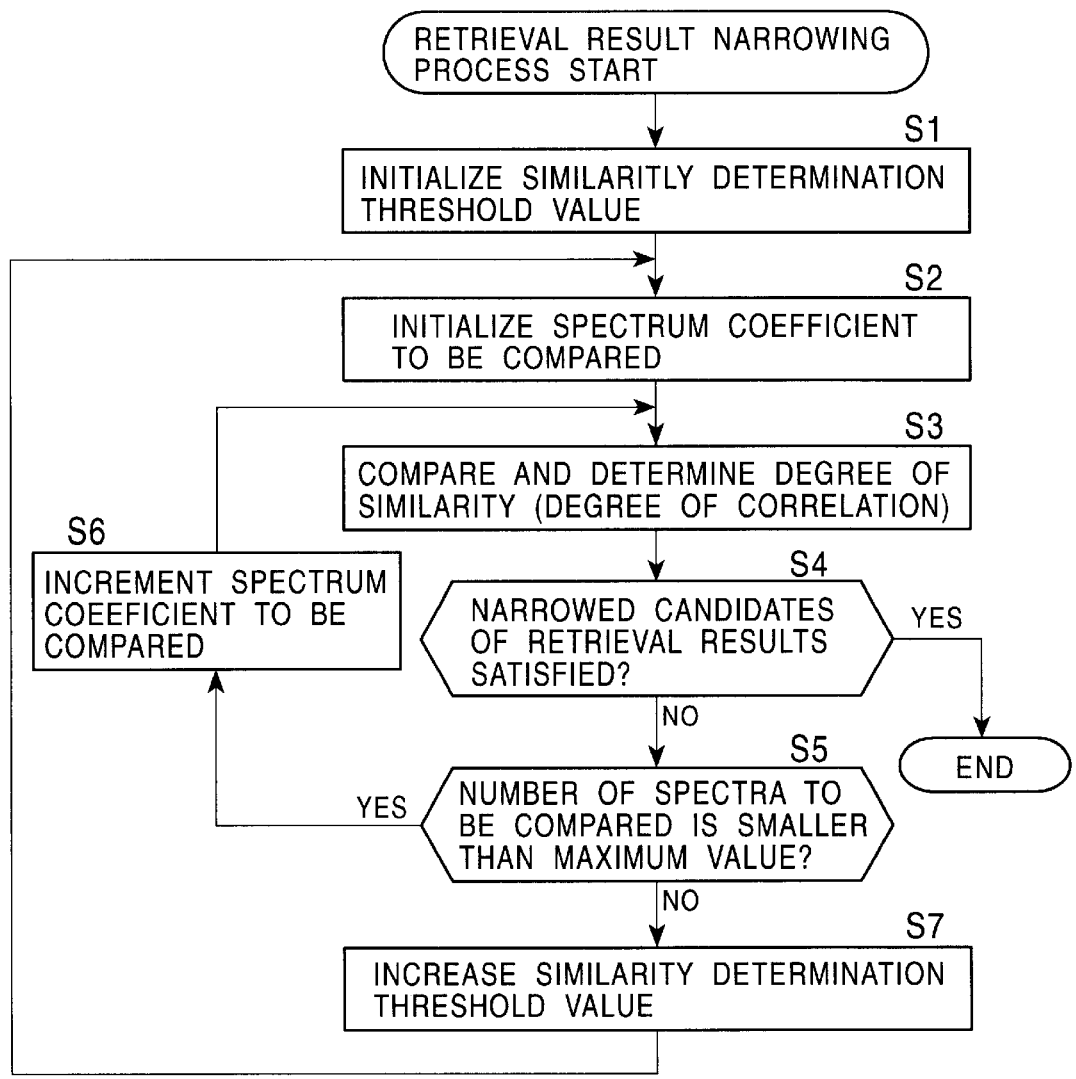
FIG. 6 is a flowchart illustrating a retrieval result narrowing process.

A process for narrowing this retrieval result is described with reference to the flowchart of FIG. 6. In step S1, the comparison and determination section 24 initializes a threshold value serving as a determination criterion for similarity. In step S2, the comparison and determination section 24 initializes the number of frequency bands (the number of spectra) of a sample waveform, which is the retrieval conditions, to a predetermined value.

The coded audio data stored in the database (the hard disk 4) is sequentially read in correspondence with this setting of the retrieval conditions, the spectrum coefficient of the frequency band corresponding to the retrieval conditions is decoded therefrom by the bit extraction section 21 to the inverse quantization section 23, and this is output to the comparison and determination section 24. On the other hand, the spectrum transformation section 25 computes the spectrum coefficient of the sample waveform and outputs it to the comparison and determination section 24.

In step S3, the comparison and determination section 24 computes a correlation coefficient (degree of similarity) of the spectrum coefficient of the coded audio data input from the inverse quantization section 23, and the spectrum coefficient of the sample waveform input from the spectrum transformation section 25, and extracts correlation coefficients in which the value of the computed correlation coefficient is larger than the threshold value set in step S1 and assumes them to be the retrieval results.

In step S4, the comparison and determination section 24 determines whether or not the retrieval result is satisfactory, for example, by determining whether or not the number of coded audio data retrieved in step S3 is equal to or less than a predetermined value. When it is determined that the number of coded audio data retrieved in step S3 is equal to or greater than the predetermined value and that the retrieval result is not satisfactory, the process proceeds to step S5.

In step S5, the comparison and determination section 24 determines whether or not the number of frequency bands of the sample waveform, which is set as the retrieval conditions, is less than its maximum value. When it is determined that the number of frequency bands (number of spectra) of the sample waveform, which is the retrieval conditions, is less than its maximum value, the number of frequency bands (number of spectra) of the sample waveform, which is the retrieval conditions, is incremented by 1 in step S6, and the process returns to step S3.

Thereafter, processing from steps S3 to S6 is repeated. When it is determined in step S5 that the number of frequency bands of the sample waveform, which is the retrieval conditions, is not less than (equal to) its maximum value, in step S7, the comparison and determination section 24 increments the threshold value which is a determination criterion for similarity by a predetermined value.

Thereafter, processing from steps S2 to S7 is repeated. When it is determined in step S4 that the number of coded audio data retrieved in step S3 is equal to or less than the predetermined value and that the retrieval result is satisfactory, the retrieval result narrowing process is terminated.

Figure 7:
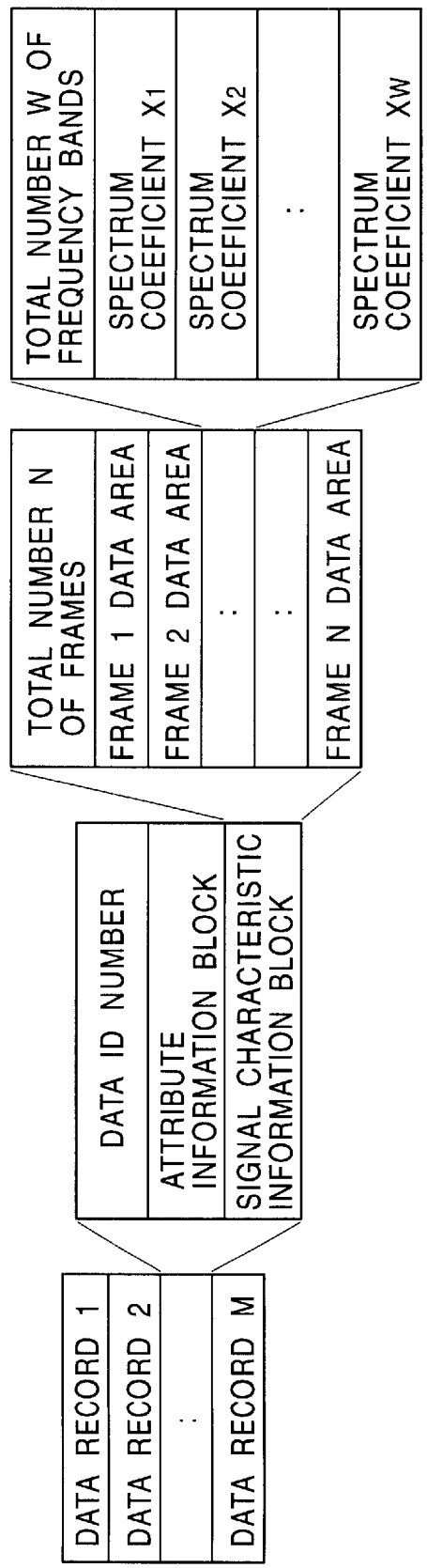
FIG. 7 is a diagram showing an example of the format of a recording medium in which signal characteristics are hierarchically recorded.

FIG. 7 shows an example of the format of audio data recorded in a recording medium which is used as a database. In this format, each piece of audio data (data records 1 to M) is formed of a data identification number for identifying each piece of audio data, an attribute information block in which attribute information is written, and a signal characteristics information block in which signal characteristics of the audio data are written.

The attribute information written in the attribute information block is text data, for example, author name of the audio data, music title, singer name, classification, copyright information, creation date, etc.

The signal characteristics information block is formed of an area in which the total number N of frames is written and an area (frame data area) in which the spectrum coefficient of each frame is written.

In the frame data area, the total number W of divided frequency bands and the spectrum coefficients $X_1$ to $X_W$ of each frequency band are written in sequence starting from the lower frequency band.

In this frame data area, assuming the total number W of divided frequency bands to be 1, the DC components of the spectrum coefficient of this frame may be written in the spectrum coefficient $X_1$.

Figure 8A:
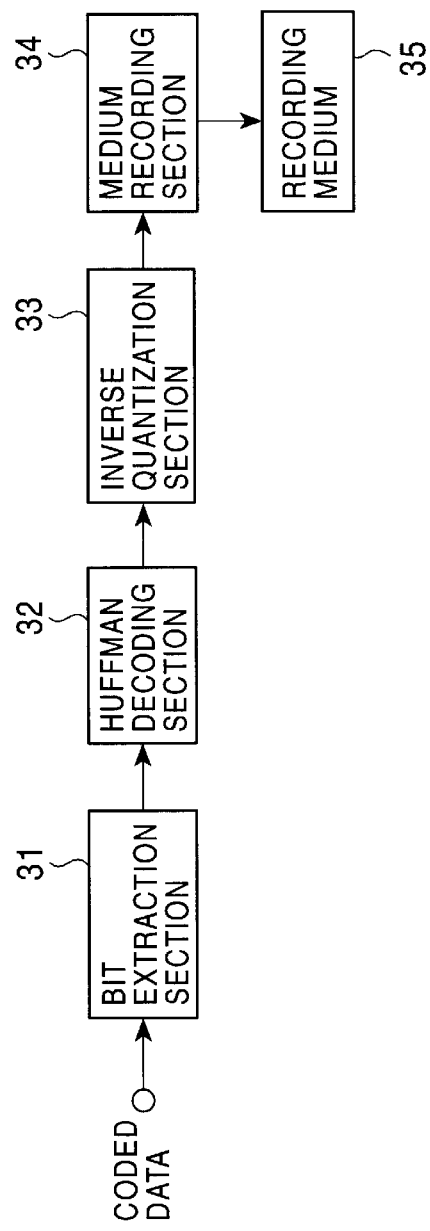
FIGS. 8A and 8B show examples of the construction of an information recording apparatus for recording signal characteristics in the format shown in FIG. 7.
Figure 8B:
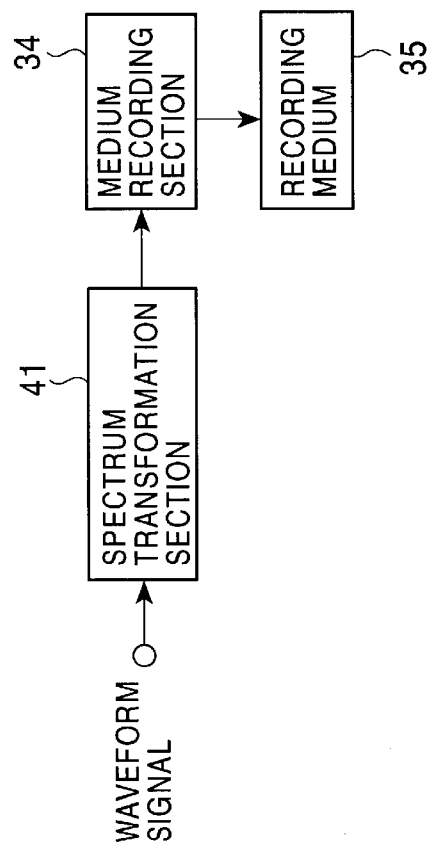
Figure 24:
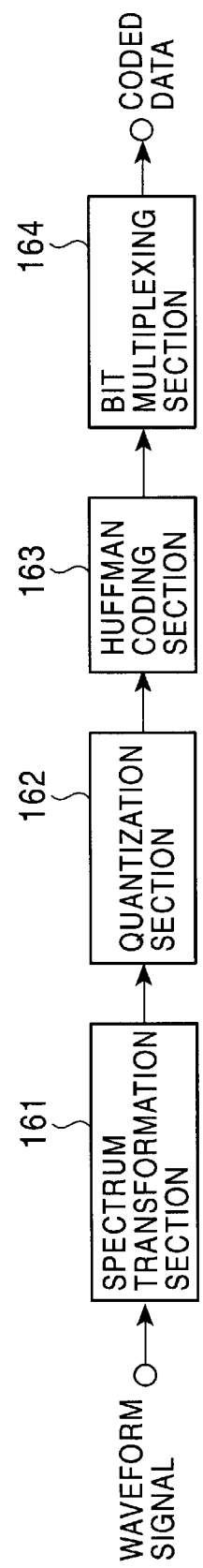
FIG. 24 is a block diagram showing the construction of a conventional coding apparatus.
Figure 25:
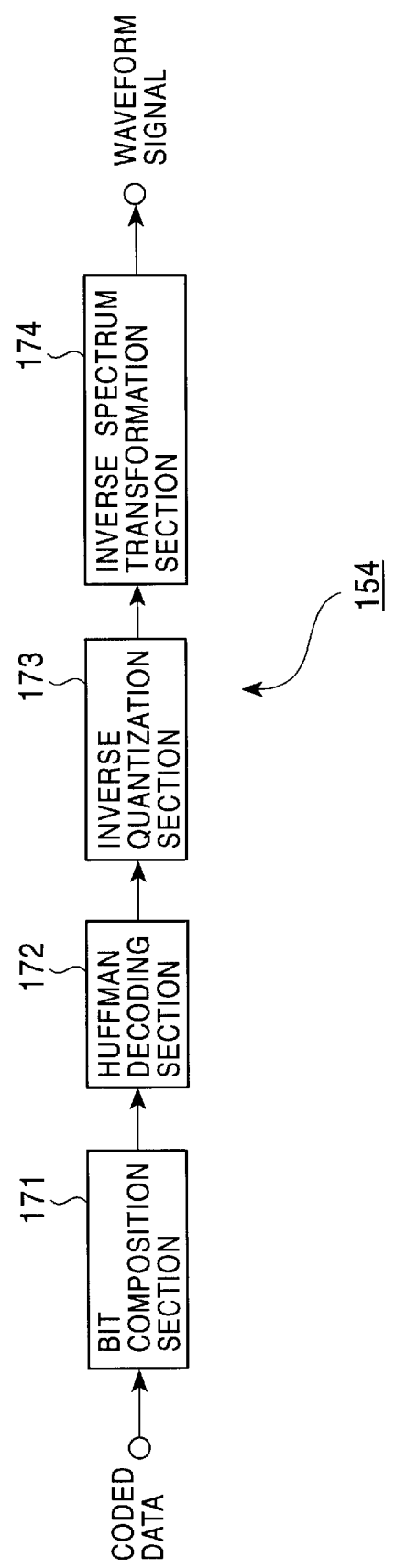
FIG. 25 is a block diagram showing the construction of a decoding section 154 of FIG. 23.

FIGS. 8A and 8B show examples of the construction of an information recording apparatus for recording audio data having the format shown in FIG. 7 in a recording medium. FIG. 8A shows an example of the construction in which coded audio data created by a conventional information coding apparatus (FIG. 24) is an input signal. A predetermined spectrum coefficient of the input coded audio data is extracted by a bit extraction section 31, is decoded by a Huffman decoding section 32, and is inversely quantized by an inverse quantization section 33, and the obtained spectrum coefficient is recorded in a recording medium 35 in the format shown in FIG. 7 by a medium recording section 34.

FIG. 8B shows an example of the construction in which an audio waveform signal is an input signal. The input audio waveform signal is divided into blocks by a spectrum transformation section 41 and is converted into a spectrum coefficient in block units. The obtained spectrum coefficient is recorded in the recording medium 35 in the format shown in FIG. 7 by the medium recording section 34.

Figure 9:
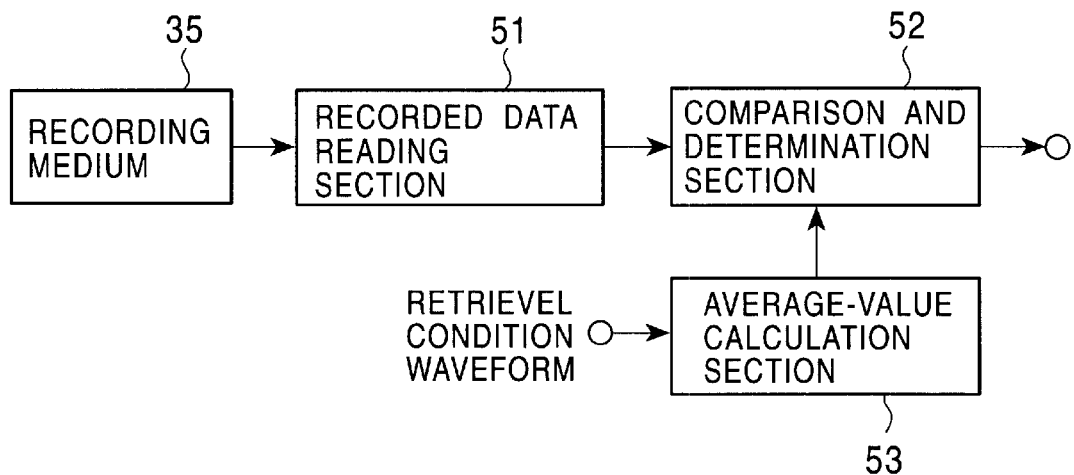
FIG. 9 is a block diagram showing an example of the functional construction of the audio data retrieval apparatus of FIG. 1.

FIG. 9 shows an example of the construction of the functional blocks of an audio data retrieval apparatus in which the recording medium 35 is used as a database, in which the DC components of a spectrum coefficient of a frame are written in the spectrum coefficient $X_1$ in the frame data area of the format shown in FIG. 7 by assuming the total number W of the frequency bands to be 1.

A recorded data reading section 51 reads the spectrum coefficient $X_1$ (the DC components of the spectrum coefficient of the frame) of the frame data area corresponding to the retrieval conditions within the signal characteristics information block of the audio data recorded in the recording medium 35 and outputs it to a comparison and determination section 52. The DC components of the spectrum coefficient are equal to the amplitude average value for each block of the original waveform signal before being coded due to the characteristics of discrete cosine transform during coding time.

An average-value calculation section 53 computes the amplitude average value in block units of the sample waveform input as the retrieval conditions and outputs it to the comparison and determination section 52.

The comparison and determination section 52 determines the degree of similarity of the DC components of the spectrum coefficient with respect to the amplitude average value of the waveform signal by computing a correlation coefficient of the DC components of the spectrum coefficient input from the recorded data reading section 51 and the amplitude average value in block units of the sample waveform input from the average-value calculation section 53. Furthermore, the comparison and determination section 52 determines the matching or mismatching of both by comparing the determined degree of similarity with a predetermined value and outputs the result. Also, the comparison and determination section 52 may output a value of the degree of similarity.

In a manner as described above, in the example of the construction of FIG. 9, since only the DC components of the coded spectrum coefficient are decoded, the processing time is shorter than in a case in which all the coded spectrum coefficients are coded, and a waveform signal obtained by performing inverse spectrum transform thereon is compared with a sample signal as in the conventional retrieval method. Also, it is possible to narrow the retrieval result by gradually increasing the above-described threshold value.

Figure 10:
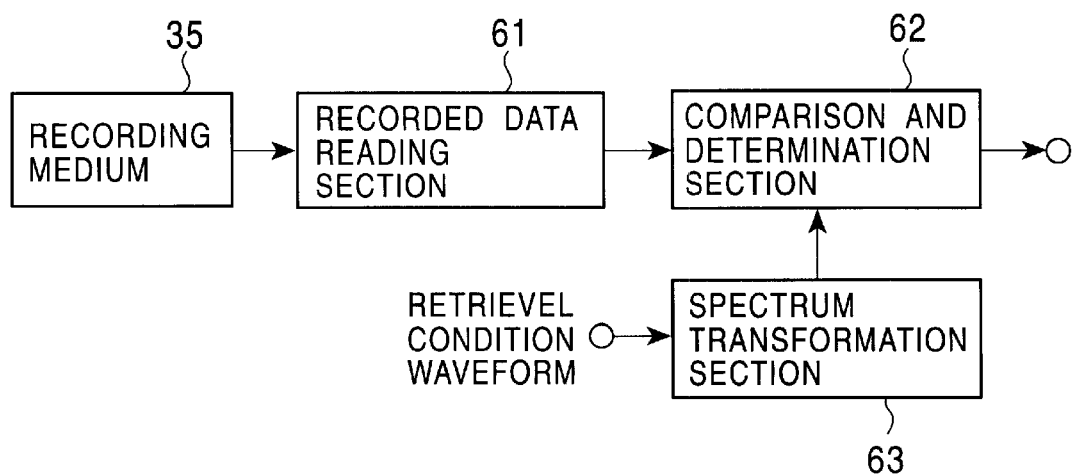
FIG. 10 is a block diagram showing an example of the construction of the functional blocks of the audio data retrieval apparatus of FIG. 1.

FIG. 10 shows an example of the construction of the functional blocks of an audio data retrieval apparatus in which the recording medium 35 having recorded thereon the audio data in the format shown in FIG. 7 is used as a database.

A recorded data reading section 61 reads only the spectrum coefficient of the frequency bands corresponding to the retrieval conditions from the frame data area within the signal characteristics information block of the audio data recorded in the recording medium 35 and outputs it to the comparison and determination section 62. That is, in a step for narrowing the retrieval result, the number of spectrum coefficients to be read is gradually increased.

A spectrum transformation section 63 computes a spectrum coefficient of the frequency band of a sample waveform input as the retrieval conditions and outputs it to the comparison and determination section 62.

The comparison and determination section 62 computes a correlation coefficient of the spectrum coefficient of the frequency band corresponding to the retrieval conditions input from the recorded data reading section 61 and the spectrum coefficient of the sample waveform input from the spectrum transformation section 63, thereby determining the degree of similarity of both. Furthermore, the comparison and determination section 62 determines the matching or mismatching of both by comparing the determined degree of similarity with a predetermined threshold value and outputs the result. Also, the comparison and determination section 62 may output a value of the degree of similarity.

In a case in which the retrieval result is to be further narrowed in this example of the construction, if retrieval is performed by gradually increasing the number of frequency bands of a sample waveform, which is the retrieval conditions, and the threshold value for similarity determination, the retrieval result can be narrowed to a hierarchically detailed degree.

Figure 11:
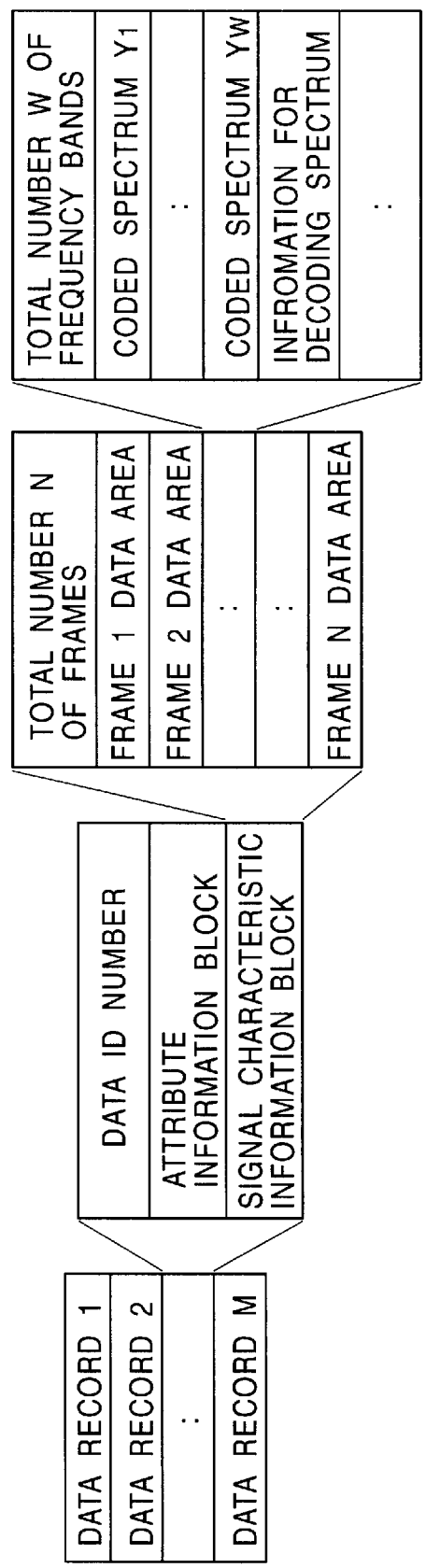
FIG. 11 is a diagram showing an example of the format of a recording medium in which signal characteristics are hierarchically recorded.

FIG. 11 shows a modification of the format shown in FIG. 7. In the frame data area of this modification, the total number W of divided frequency bands, coded spectra $Y_1$ to $Y_W$ of each frequency band, and information (a spectrum normalization coefficient, a quantization width coefficient, and the code number of a Huffman code book, etc.) for decoding the coded spectra $Y_1$ to $Y_W$ are written.

Figure 12:
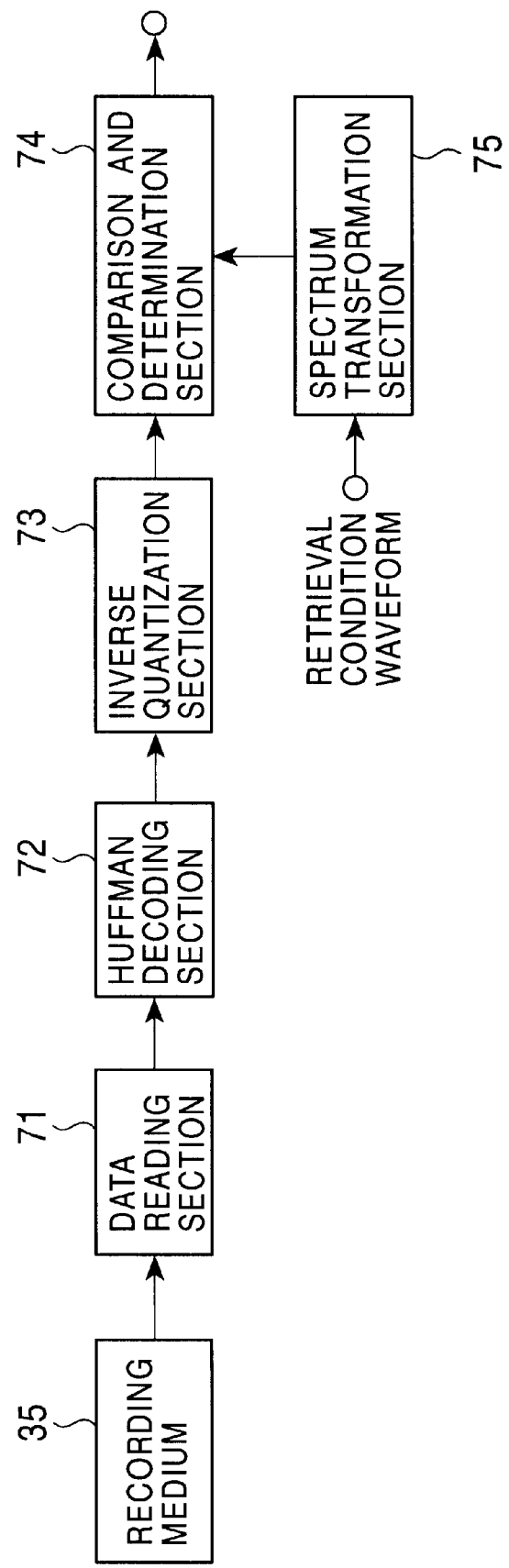
FIG. 12 is a block diagram showing an example of the functional construction of the audio data retrieval apparatus of FIG. 1.

FIG. 12 shows an example of the construction of the functional blocks of an audio data retrieval apparatus in which the recording medium 35 having recorded thereon audio data in the format shown in FIG. 11 is used as a database. A recorded data reading section 71 reads a spectrum coefficient of the frequency band corresponding to the retrieval conditions and information for decoding a spectrum from the frame data area within the signal characteristics information block of the audio data recorded in the recording medium 35, and outputs it to a Huffman decoding section 72. The output coded spectrum is decoded by the Huffman decoding section 72 in accordance with the information for decoding spectrum and is inversely quantized by an inverse quantization section 73, and the obtained spectrum coefficient is output to a comparison and determination section 74.

A spectrum transformation section 75 computes a spectrum coefficient for each frequency band of the sample waveform input as the retrieval conditions and outputs it to the comparison and determination section 74.

The comparison and determination section 74 determines the degree of similarity by computing a correlation coefficient of the spectrum coefficient of the frequency band corresponding to the retrieval conditions input from the inverse quantization section 73 and the spectrum coefficient of the sample waveform input from the spectrum transformation section 75. Furthermore, the comparison and determination section 74 determines the matching or mismatching of both by comparing the determined degree of similarity with a predetermined threshold value and outputs the result. Also, the comparison and determination section 74 may output a value of the degree of similarity.

In a case in which the retrieval result is to be further narrowed in this example of the construction, if retrieval is performed by gradually increasing the number of frequency bands of a sample waveform, which is the retrieval conditions, and the threshold value for similarity determination, the retrieval result can be narrowed to a hierarchically detailed degree.

Figure 13:
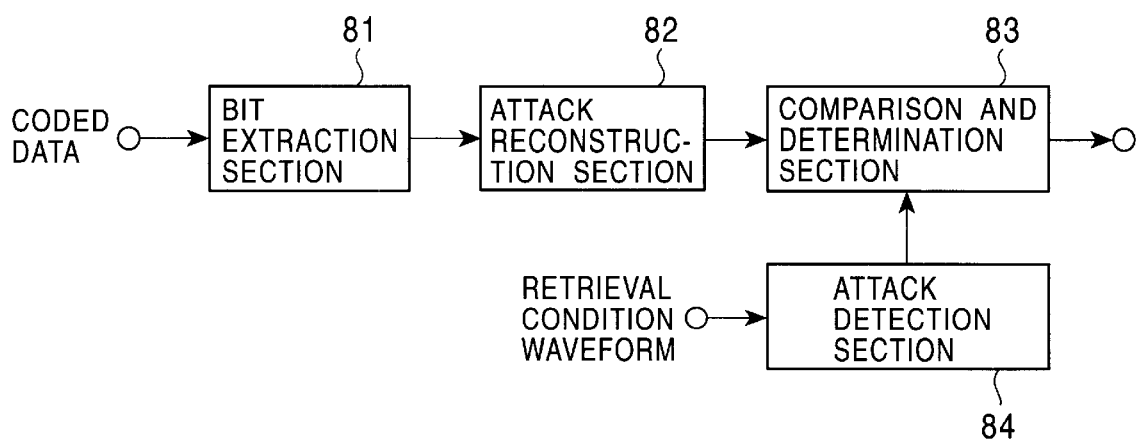
FIG. 13 is a block diagram showing an example of the functional construction of the audio data retrieval apparatus of FIG. 1.
Figure 14:
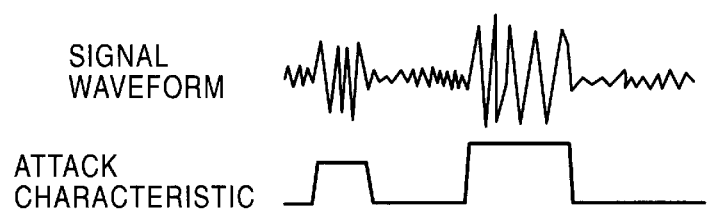
FIG. 14 is a diagram illustrating the retrieval conditions.

FIG. 13 shows another example of the construction of an audio data retrieval apparatus. In this example of the construction, coded audio data is retrieved by using a point of sudden change in the amplitude (attack) of a waveform signal such as that shown in FIG. 14 as the retrieval conditions. It is assumed that attack information (the position and the level of the attack) is prestored in coded audio data to be retrieved.

A bit extraction section 81 sequentially reads coded audio data stored in the hard disk 4, extracts therefrom coded attack information, and outputs it to an attack reconstruction section 82. Here, rather than extracting all the attack information, for example, some of the attack characteristics corresponding to the retrieval conditions are extracted as for the first attack information of the first window section of the frame for each predetermined frame.

The attack reconstruction section 82 reconstructs the attack information input from the bit extraction section 81 and outputs the position and the level of the obtained attack to a comparison and determination section 83.

An attack detection section 84 detects attack information of the sample waveform input as the retrieval conditions and outputs it to the comparison and determination section 83.

The comparison and determination section 83 computes a correlation coefficient of the attack information input from the attack reconstruction section 82 and the attack information of the sample waveform input from the attack detection section 84, thereby determining the degree of similarity of both. Furthermore, the comparison and determination section 83 determines the matching or mismatching of both by comparing the determined degree of similarity with a predetermined threshold value and outputs the result. Also, the comparison and determination section 83 may output a value of the degree of similarity.

In the example of the construction of FIG. 13, it is possible to narrow the retrieval result by gradually increasing the range in which attack information, which is the retrieval conditions, is to be extracted.

Figure 15:
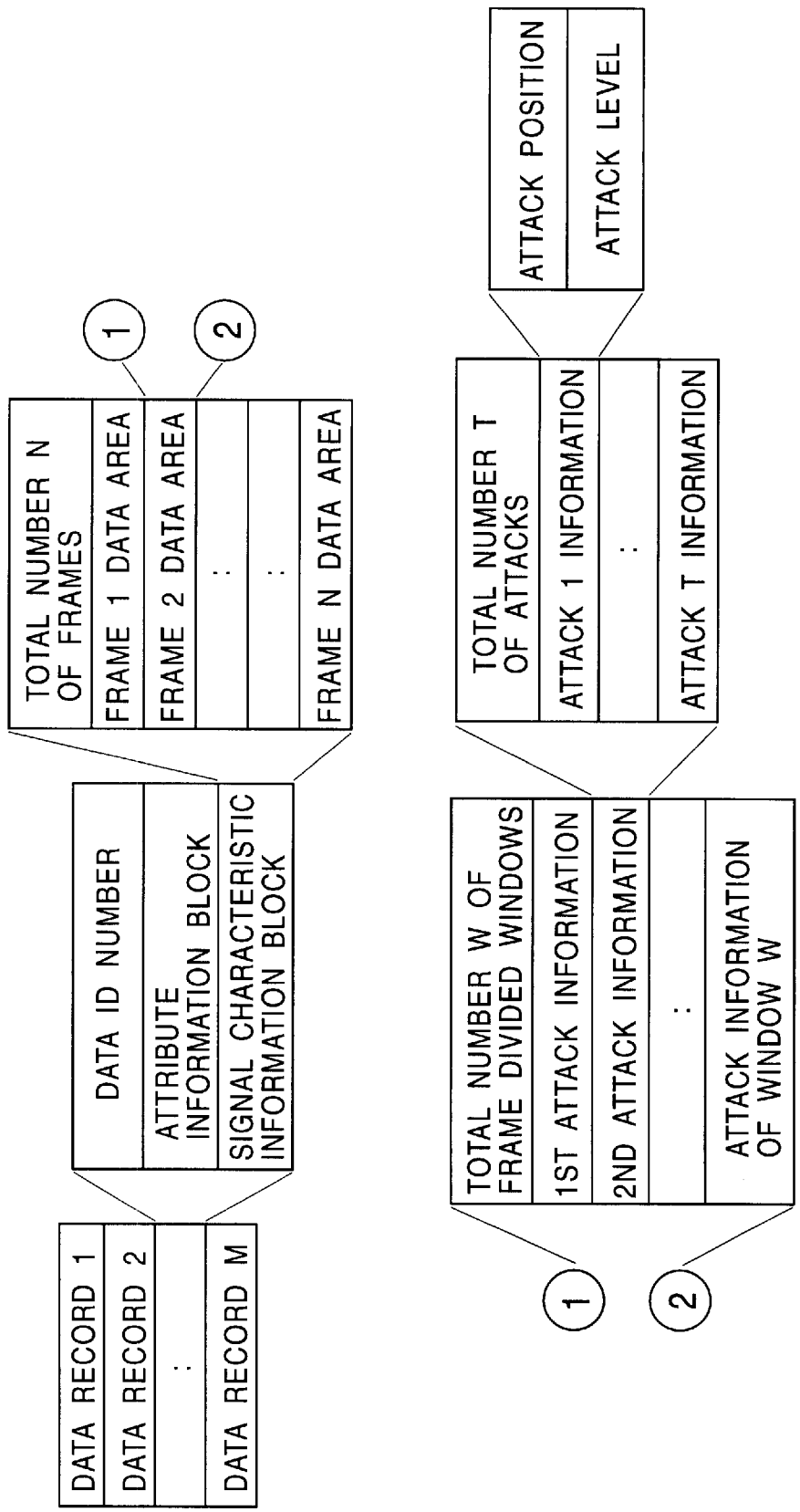
FIG. 15 is a diagram showing an example of the format of a recording medium in which signal characteristics are hierarchically recorded.

FIG. 15 shows an example of the format of audio data, recorded on a recording medium, which is used as a database. In this format, each piece of audio data (data records 1 to M) is formed of a data identification number for identifying each piece of audio data, an attribute information block in which attribute information is written, and a signal characteristics information block in which signal characteristics of the audio data are written.

The attribute information written in the attribute information block is text data, for example, author name of the audio data, music title, singer name, classification, copyright information, creation date, etc.

The signal characteristics information block is formed of an area for writing the total number N of frames and an area (frame data area) for writing the signal characteristics of each frame. In the frame data area, the total number W of section windows which are set in the frame and the attack information of each section window are written, and in the attack information of each section window, the total number T of attacks present in the section window, and the position and the level of each attack are written. The position of the attack is represented by a relative position within the frame section and the window section of the attack. Also, the level of the attack is represented by the degree of the sudden change in the amplitude of the attack.

Figure 16A:
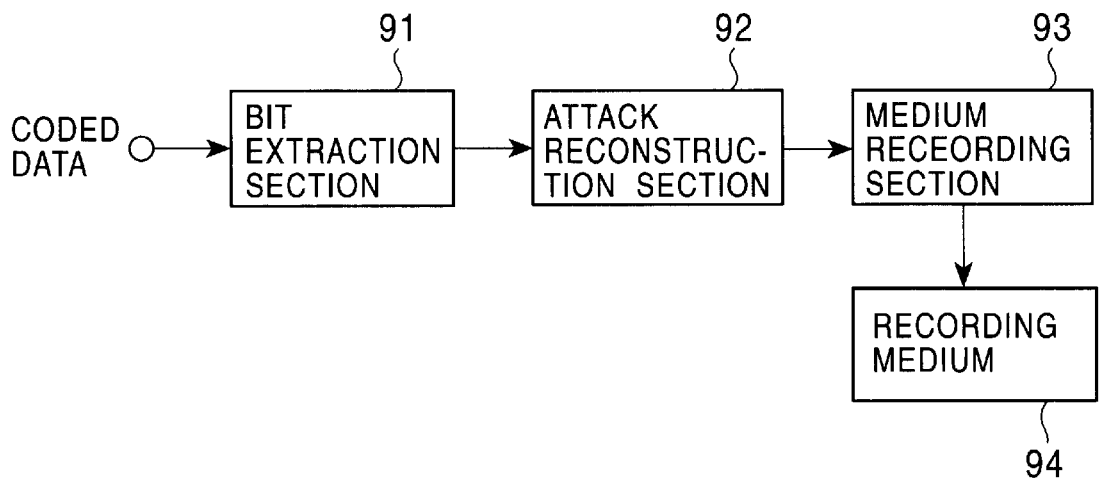
FIGS. 16A and 16B show examples of the construction of an information recording apparatus for recording signal characteristics in the format shown in FIG. 15.
Figure 16B:
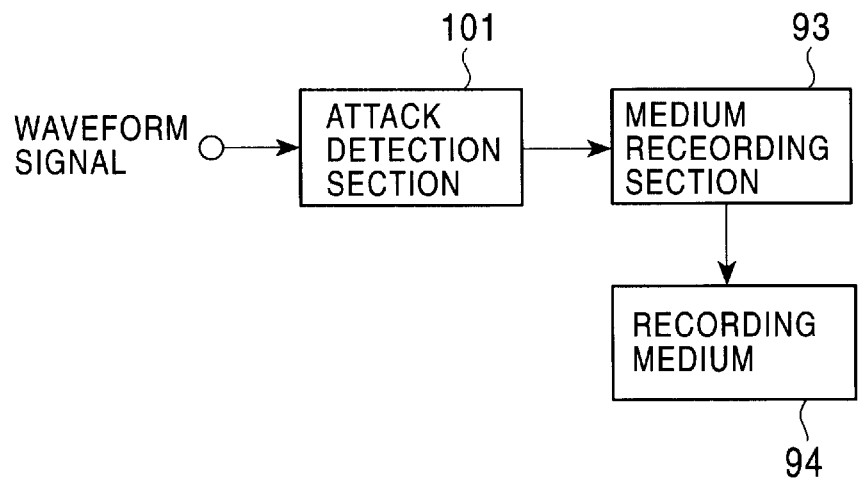

FIGS. 16A and 16B show examples of the construction of an information recording apparatus for recording audio data having the format shown in FIG. 15 in a recording medium. FIG. 16A shows an example of the construction in which coded audio data in which attack information has been coded is an input signal. A bit extraction section 91 extracts predetermined coded attack information from the input coded audio data. The extracted coded attack information is reconstructed by an attack reconstruction section 92, and the position and the level of the obtained attack are recorded in a recording medium 94 in the format shown in FIG. 15 by a medium recording section 93.

FIG. 16B shows an example of the construction in which an audio waveform signal is an input signal. An attack detection section 101 detects an attack from the input audio waveform signal, and the position and the level thereof are recorded in the recording medium 94 in the format shown in FIG. 15 by the medium recording section 93.

Figure 17:
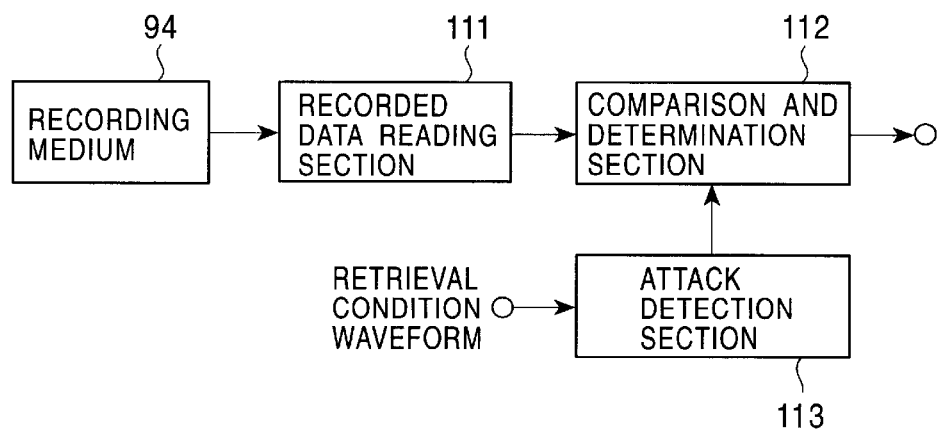
FIG. 17 is a block diagram showing an example of the functional construction of the audio data retrieval apparatus of FIG. 1.

FIG. 17 shows an example of the construction of the functional blocks of an audio data retrieval apparatus in which the recording medium 94 having recorded thereon audio data in the format shown in FIG. 15 is used as a database.

A recorded data reading section 111 reads only some of the attack information corresponding to the retrieval conditions (for example, the first attack information of the first section window for each predetermined frame) from the signal characteristics information block of the audio data recorded in the recording medium 94 and outputs it to a comparison and determination section 112.

An attack detection section 113 detects an attack of the sample waveform input as the retrieval conditions and outputs the position and the level thereof to the comparison and determination section 112.

The comparison and determination section 112 computes a correlation coefficient of the attack information corresponding to the retrieval conditions input from the recorded data reading section 111, and the attack information of the sample waveform input from the attack detection section 113, thereby determining the degree of similarity of both. Furthermore, the comparison and determination section 112 determines the matching or mismatching of both by comparing the determined degree of similarity with a predetermined threshold value and outputs the result. Also, the comparison and determination section 112 may output a value of the degree of similarity.

In a case in which the retrieval result is to be narrowed in this example of the construction, if retrieval is performed by gradually increasing the attack information detected from the sample waveform, which is the retrieval conditions, by increasing the number of section windows, and by gradually increasing the threshold value for similarity determination, the retrieval result can be narrowed to a hierarchically detailed degree.

Figure 18:
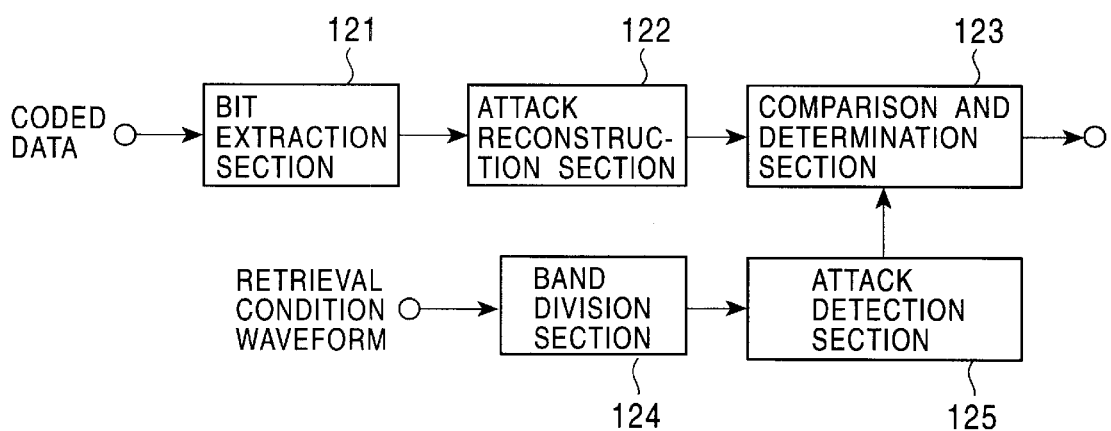
FIG. 18 is a block diagram showing an example of the functional construction of the audio data retrieval apparatus of FIG. 1.
Figure 19:
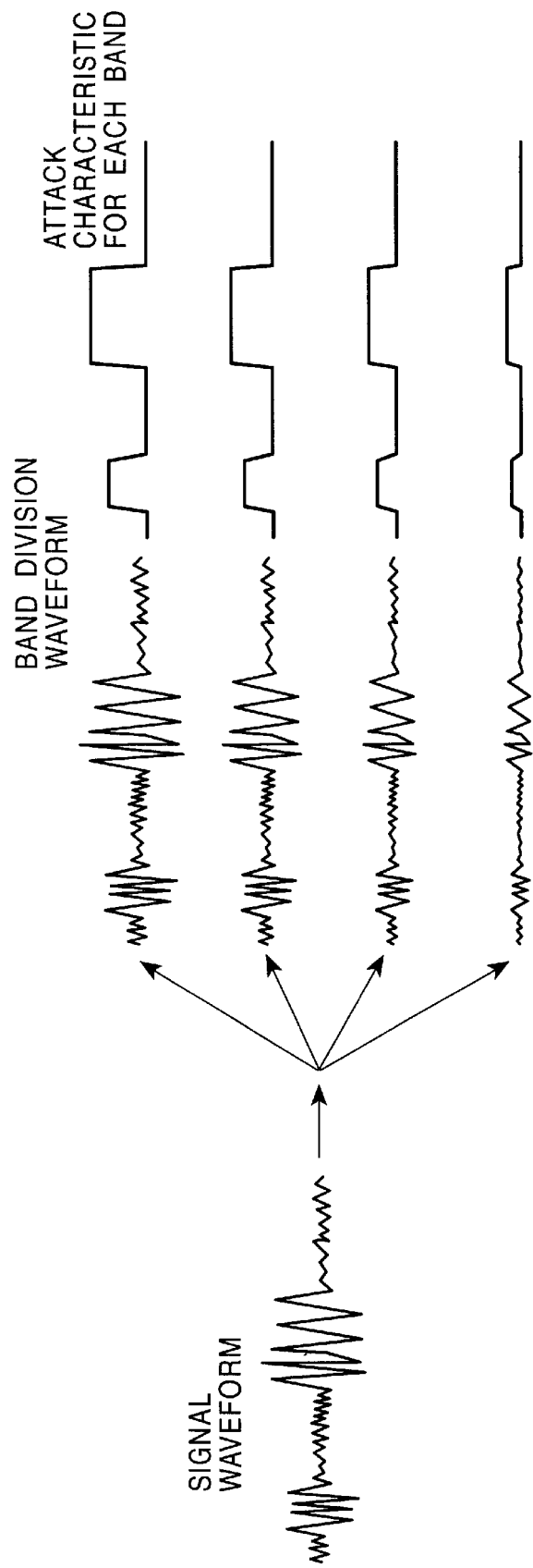
FIG. 19 is a diagram illustrating the retrieval conditions.

FIG. 18 shows another example of the construction of an audio data retrieval apparatus. In this example of the construction, audio coded data is retrieved by using an attack for each frequency band of a waveform signal, such as that shown in FIG. 19, as the retrieval conditions. It is assumed that attack information (the position and the level of the attack) is prestored in the coded audio data to be retrieved.

A bit extraction section 121 sequentially reads coded audio data stored on the hard disk 4, extracts therefrom coded attack information, and outputs it to an attack reconstruction section 122. Here, rather than extracting all the attack information, some of the attack characteristics corresponding to the retrieval conditions (for example, the first attack information of the first section window of the lowest frequency band for each predetermined frame) are extracted.

The attack reconstruction section 122 reconstructs the attack information input from the bit extraction section 121 and outputs the position and the level of the obtained attack to a comparison and determination section 123.

A band division section 124 divides the sample waveform input as the retrieval conditions into predetermined frequency bands and outputs them to an attack detection section 125. The attack detection section 125 detects attack information of each band from the band-divided sample waveform input from the band division section 124 and outputs the position and the level thereof to the comparison and determination section 123.

The comparison and determination section 123 computes a correlation coefficient of the attack information for each frequency band input from the attack reconstruction section 122 and the attack information for each frequency band of the sample waveform input from the attack detection section 125, thereby determining the degree of similarity of both. Furthermore, the comparison and determination section 123 determines the matching or mismatching of both by comparing the determined degree of similarity with a predetermined threshold value and outputs the result. Also, the comparison and determination section 123 may output a value of the degree of similarity.

In the construction of FIG. 18, by gradually increasing, for example, the number of frequency bands in which attack information, which is the retrieval conditions, is extracted, the retrieval result can be narrowed.

Figure 20:
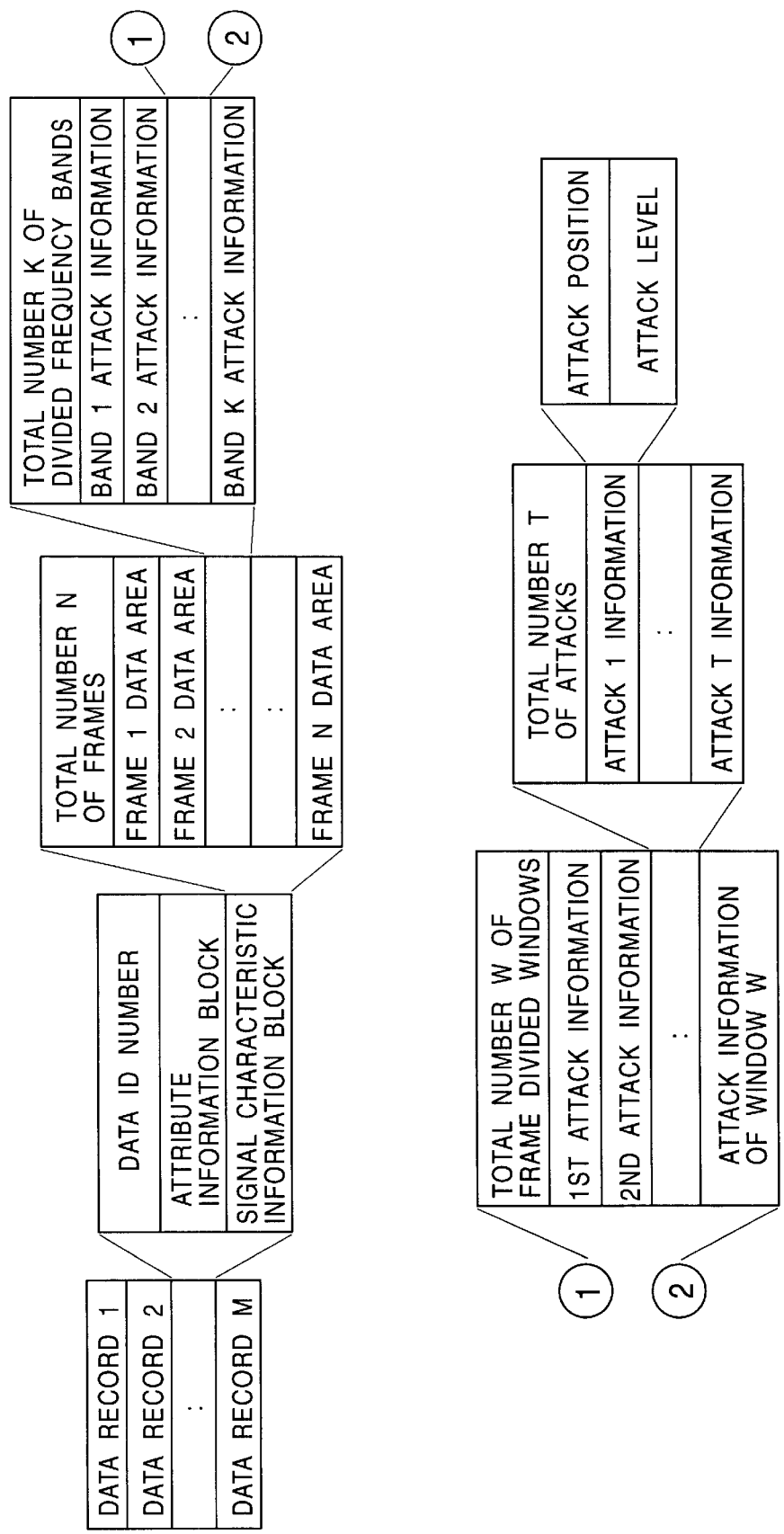
FIG. 20 is a diagram showing an example of the format of a recording medium in which signal characteristics are hierarchically recorded.

FIG. 20 shows an example of the format of audio data, recorded on a recording medium, which is used as a database. In this format, each piece of audio data (data records 1 to M) is formed of a data identification number for identifying audio data, an attribute information block in which attribute information is written, and a signal characteristics information block in which signal characteristics of audio data are written.

The attribute information written in the attribute information block is text data, for example, author name of the audio data, music title, singer name, classification, copyright information, creation date, etc.

The signal characteristics information block is formed of an area in which the total number N of frames is written, and an area (frame data area) in which the signal characteristics of each frame are written.

In the frame data area, the total number K of divided frequency bands and the attack information for each frequency band are written.

In the attack information for each frequency band, the total number W of section windows, which is set in the frame, and the attack information of each section window, are written, and In the attack information of each section window, the total number T of attacks and the position and the level of each attack are written.

The construction of the information recording apparatus which writes audio data in the format shown in FIG. 20 in a recording medium is the same as that of the information recording apparatus shown in FIG. 16, and accordingly, the description thereof has been omitted.

Figure 21:
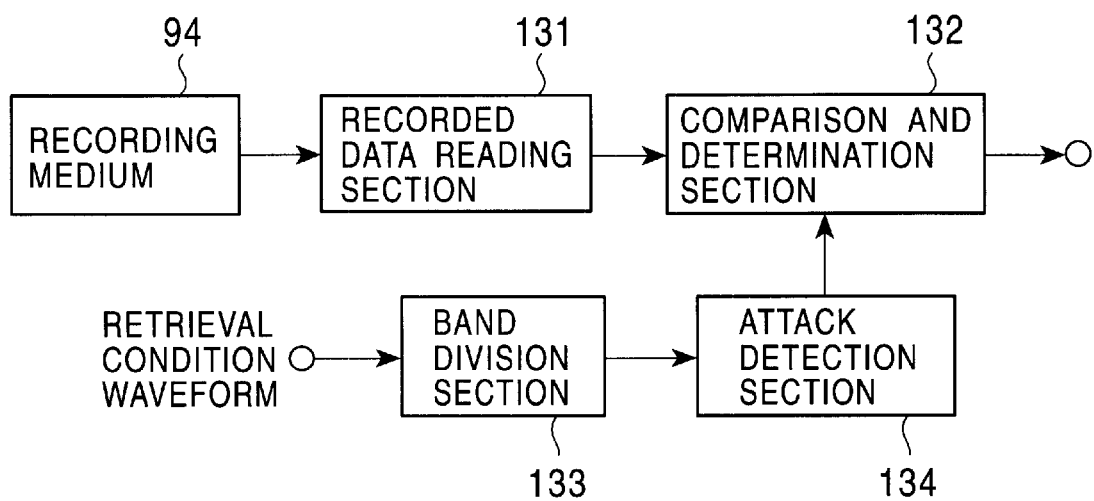
FIG. 21 is a block diagram showing an example of the functional construction of the audio data retrieval apparatus of FIG. 1.

FIG. 21 shows an example of the construction of the functional blocks of an audio data retrieval apparatus in which the recording medium 94 having recorded thereon audio data in the format shown in FIG. 20 is used as a database.

A recorded data reading section 131 reads only some of the attack information corresponding to the retrieval conditions (for example, the first attack information of the first window section of the lowest frequency band for each predetermined frame) from the signal characteristics information block of the audio data recorded in the recording medium 94, and outputs it to a comparison and determination section 132.

A band division section 133 divides a sample waveform input as the retrieval conditions into predetermined frequency bands and outputs them to an attack detection section 134. The attack detection section 134 detects an attack for each frequency band and outputs the position and the level thereof to the comparison and determination section 132.

The comparison and determination section 132 computes a correlation coefficient of the attack information corresponding to the retrieval conditions input from the recorded data reading section 131, and the attack information for each frequency band of the sample waveform input from the attack detection section 134, thereby determining the degree of similarity of both. Furthermore, the comparison and determination section 132 determines the matching or mismatching of both by comparing the determined degree of similarity with a predetermined threshold value and outputs the result. Also, the comparison and determination section 132 may output a value of the degree of similarity.

In a case in which the retrieval result is to be narrowed in this example of the construction, if retrieval is performed by gradually increasing the number of frequency bands, which is the retrieval conditions, and by gradually increasing the threshold value for similarity determination, the retrieval result can be narrowed to a hierarchically detailed degree.

In this embodiment, retrieval is performed by using coded audio data, recorded on a recording medium, as a database. In addition, it is possible to perform retrieval by using bit streams of audio data which are sequentially input as a database.

Figure 22:
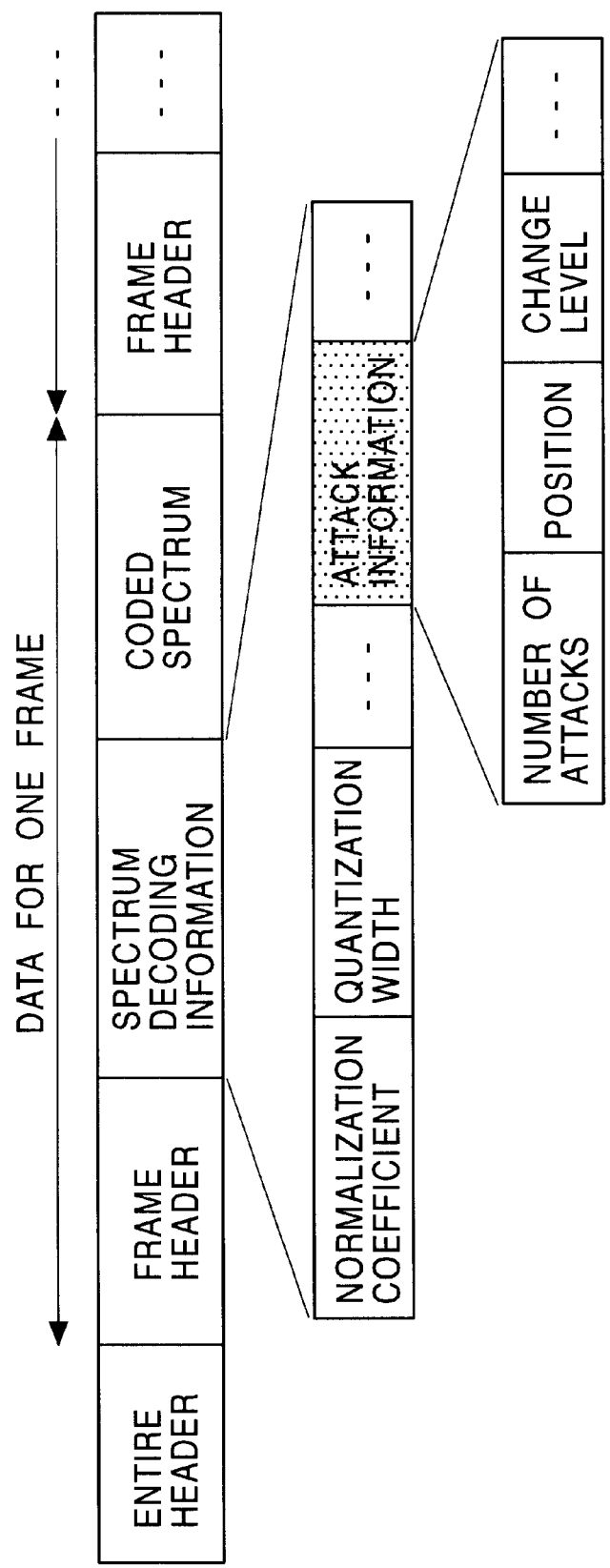
FIG. 22 is a diagram showing an example of the format of a bit stream in which signal characteristics are hierarchically recorded.
Figure 23:
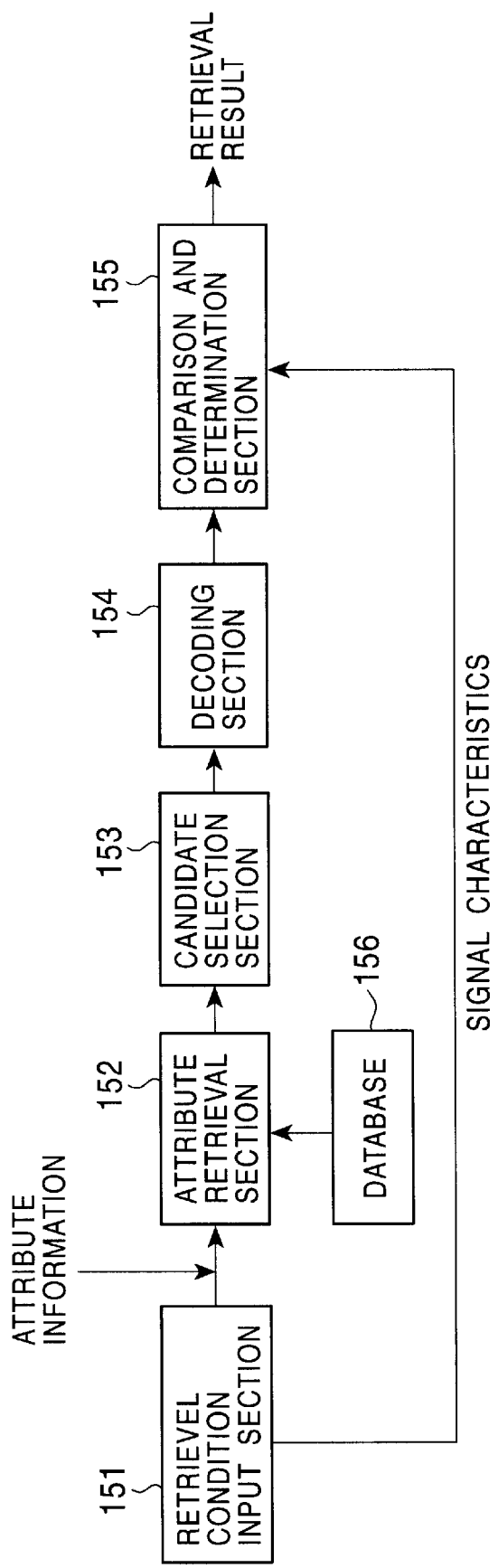
FIG. 23 is a block diagram showing an example of the construction of a conventional audio data retrieval apparatus.

FIG. 22 shows an example of the format of a bit stream of such audio coded data. In this bit stream, data of each frame is stored in sequence following the entire header. The data of each frame is formed of a frame header, spectrum decoding information, and a coded spectrum. As the spectrum decoding information, a normalization coefficient, a quantization width coefficient, attack information, etc., required for decoding a spectrum, are stored, and as the attack information, the number of attacks, the position of the attack, and the level thereof are stored.

Furthermore, in addition to the retrieval of audio data, the present invention can be applied to the retrieval of video data.

The computer program for performing each of the above-described processes may be provided to a user via a distribution medium comprising an information recording medium, such as a magnetic disk or a CD-ROM, and via a network distribution medium, such as the Internet or a digital satellite.

As described above, according to the information processing apparatus, the information processing method, and the distribution medium of the present invention, some of the AV data, which is coded in such a manner as to correspond to the retrieval conditions, is decoded, a correlation coefficient of the decoded AV data and the retrieval conditions is computed to compare it with a predetermined threshold value, and the retrieval condition or the threshold value is incremented. This makes it possible to efficiently retrieve the AV data by using the signal characteristics as the retrieval condition.

According to the information processing apparatus, the information processing method, and the distribution medium of the present invention, some of the signal characteristics are extracted from AV data in which signal characteristics are hierarchically recorded in such a manner as to correspond to the retrieval condition, a correlation coefficient of the decoded AV data and the retrieval condition is computed to compare it with a predetermined threshold value, and the retrieval condition or the threshold value is incremented. This makes it possible to efficiently retrieve the AV data by using the signal characteristics as the retrieval condition.

According to the information recording apparatus, the information recording method, and the distribution medium of the present invention, the signal characteristics of input AV data are detected, and the detected signal characteristics are hierarchically recorded. This makes it possible to extract some of the signal characteristics.

According to the recording medium of the present invention, AV data having signal characteristics hierarchically formed therein is recorded, thereby making it possible to extract some of the signal characteristics.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus for retrieving coded audiovisual (AV) data, said information processing apparatus comprising:
    accepting means for accepting a retrieval condition;
    decoding means for decoding a part of said AV data which is coded in such a manner as to correspond to the retrieval condition accepted by said accepting means;
    computation means for computing a correlation coefficient of the retrieval condition accepted by said accepting means and the AV data decoded by said decoding means;
    comparison means for comparing said correlation coefficient computed by said computation means with a predetermined threshold value; and
    incrementing means for incrementing said retrieval condition or said threshold value.

2. An information processing apparatus according to claim 1, wherein said retrieval condition is an average value of spectrum coefficients for each block.

3. An information processing apparatus according to claim 1, wherein said retrieval condition is a spectrum coefficient value for each frequency band.

4. An information processing apparatus according to claim 1, wherein said retrieval condition is attack information for each block.

5. An information processing apparatus according to claim 1, wherein said retrieval condition is attack information for each frequency band.

6. An information processing method for retrieving coded AV data, said information processing method comprising:
    an accepting step for accepting a retrieval condition;
    a decoding step for decoding a part of said AV data which is coded in such a manner as to correspond to the retrieval condition accepted in said accepting step;
    a computing step for computing a correlation coefficient of the retrieval condition accepted in said accepting step and the AV data decoded in said decoding step;
    a comparing step for comparing said correlation coefficient computed in said computation step with a predetermined threshold value; and
    an incrementing step for incrementing said retrieval condition or said threshold value.

7. A distribution medium for distributing a computer-readable program to an information processing apparatus for retrieving coded AV data in order to execute a process, said process comprising:
    an accepting step for accepting a retrieval condition;
    a decoding step for decoding a part of said AV data which is coded in such a manner as to correspond to the retrieval condition accepted in said accepting step;

a computing step for computing a correlation coefficient of the retrieval condition accepted in said accepting step and the AV data decoded in said decoding step;

a comparing step for comparing said correlation coefficient computed in said computation step with a predetermined threshold value; and an incrementing step for incrementing said retrieval condition or said threshold value.

8. An information processing apparatus for retrieving AV data in which signal characteristics are hierarchically recorded, said information processing apparatus comprising:

accepting means for accepting a retrieval condition;

extracting means for extracting a part of signal characteristics from AV data in which said signal characteristics are hierarchically recorded in such a manner as to correspond to the retrieval condition accepted by said accepting means;

computation means for computing a correlation coefficient of the retrieval condition accepted by said accepting means and the signal characteristics extracted by said extracting means;

comparison means for comparing said correlation coefficient computed by said computation means with a predetermined threshold value; and incrementing means for incrementing said retrieval condition or said threshold value.

9. An information processing apparatus according to claim 8, wherein said retrieval condition is an average value of spectrum coefficients for each block.

10. An information processing apparatus according to claim 8, wherein said retrieval condition is a spectrum coefficient value for each frequency band.

11. An information processing apparatus according to claim 8, wherein said retrieval condition is attack information for each block.

12. An information processing apparatus according to claim 8, wherein said retrieval condition is attack information for each frequency band.

13. An information processing method for retrieving AV data in which signal characteristics are hierarchically recorded, said information processing method comprising:

an accepting step for accepting a retrieval condition;

an extracting step for extracting a part of signal characteristics from AV data in which said signal characteristics are hierarchically recorded in such a manner as to correspond to the retrieval condition accepted in said accepting step;

a computing step for computing a correlation coefficient of the retrieval condition accepted in said accepting step and the signal characteristics extracted in said extracting step;

a comparing step for comparing said correlation coefficient computed in said computation step with a predetermined threshold value; and an incrementing step for incrementing said retrieval condition or said threshold value.

14. A distribution medium for distributing a computer-readable program to an information processing apparatus for retrieving AV data in which signal characteristics are hierarchically recorded in order to execute a process, said process comprising:

an accepting step for accepting a retrieval condition;

an extracting step for extracting a part of signal characteristics from AV data in which said signal characteristics are hierarchically recorded in such a manner as to correspond to the retrieval condition accepted in said accepting step;

a computing step for computing a correlation coefficient of the retrieval condition accepted in said accepting step and the signal characteristics extracted in said extracting step;

a comparing step for comparing said correlation coefficient computed in said computation step with a predetermined threshold value; and an incrementing step for incrementing said retrieval condition or said threshold value.

\* \* \* \* \*